US008284856B2

(12) United States Patent
Sato et al.

(10) Patent No.: US 8,284,856 B2
(45) Date of Patent: Oct. 9, 2012

(54) DATA TRANSMITTING METHOD AND DATA TRANSMITTING APPARATUS

(75) Inventors: Yoichi Sato, Tsukuba (JP); Tetsuya Higuchi, Tsukuba (JP); Masahiro Murakawa, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 1009 days.

(21) Appl. No.: 12/280,210

(22) PCT Filed: Feb. 13, 2007

(86) PCT No.: PCT/JP2007/052451
§ 371 (c)(1),
(2), (4) Date: Aug. 21, 2008

(87) PCT Pub. No.: WO2007/097219
PCT Pub. Date: Aug. 30, 2007

(65) Prior Publication Data
US 2010/0061441 A1     Mar. 11, 2010

(30) Foreign Application Priority Data

Feb. 22, 2006 (JP) .................. 2006-045746
Apr. 20, 2006 (JP) .................. 2006-117295

(51) Int. Cl.
*H04L 27/00* (2006.01)
(52) U.S. Cl. ..................................................... 375/295
(58) Field of Classification Search .................. 375/295, 375/346, 259, 136; 455/324; 370/380
See application file for complete search history.

(56) References Cited

U.S. PATENT DOCUMENTS 6,356,748 B1 * 3/2002 Namgoong et al. .......... 455/324
6,882,684 B2     4/2005 Kaku et al.
(Continued)

FOREIGN PATENT DOCUMENTS

| JP | 2000-22771 A | 1/2000 |
| JP | 2001-197139 A | 7/2001 |
| JP | 2003-188781 A | 7/2003 |
| JP | 2003-304179 A | 10/2003 |
| JP | 2005-57644 A | 3/2005 |

OTHER PUBLICATIONS

International Search Report for Serial No. PCT/JP2007/052451 dated Mar. 13, 2007.

*Primary Examiner* — Sam K Ahn
*Assistant Examiner* — Shawkat M Ali
(74) *Attorney, Agent, or Firm* — McCormick, Paulding & Huber LLP

(57) ABSTRACT

A serial-parallel converter/encoder unit 11 inputs a transmission symbol data at a transmission symbol rate that is one-Nth of a base-point symbol rate. A precoder/collator 13 creates a transmission symbol waveform at the base-point symbol rate. The transmission symbol waveform becomes a transmission signal after passing through a roll-off filter 14 with a band corresponding to the base-point symbol rate and a modulator 15. A reception signal demodulated by a demodulator 33 is input to a fractionally-spaced equalizer 38 that operates at the base-point symbol rate and is forcibly equalized at the transmission symbol rate by using a reference signal. A level of a signal output from the fractionally-spaced equalizer 38 at the transmission symbol rate is determined by a level determining unit 39 and becomes a reception symbol data by a sawtooth-function output unit 40.

7 Claims, 11 Drawing Sheets

U.S. PATENT DOCUMENTS

| | | | |
|---|---|---|---|
| 6,920,172 B2 * | 7/2005 | Williams et al. | 375/136 |
| 7,274,754 B2 * | 9/2007 | Boehlke et al. | 375/308 |
| 7,302,240 B2 | 11/2007 | Koga et al. | |
| 2003/0086515 A1 * | 5/2003 | Trans et al. | 375/346 |
| 2006/0039550 A1 * | 2/2006 | Chadha et al. | 379/406.09 |
| 2006/0087961 A1 * | 4/2006 | Chang et al. | 370/203 |

* cited by examiner

PRINCIPLE OF GENERALIZED CORRELATION SYMBOL TRANSMISSION

SAWTOOTH FUNCTION

2PAM : $a_k = b_k = \pm 1$      $P=2$
4QAM : $a_k, b_k = \pm 1$      $P=2$
16QAM : $a_k, b_k = \pm 1, \pm 3$      $P=4$
64QAM : $a_k, b_k = \pm 1, \pm 3, \pm 5$      $P=6$

DATA TRANSMISSION SYSTEM SERVING AS BASE POINT OF FALLBACK

PRECODER/CORRELATOR WITH FALLBACK FUNCTION

FRACTIONALLY-SPACED EQUALIZER WITH FALLBACK FUNCTION

OUTPUT OF FRACTIONALLY-SPACED EQUALIZER
($f_0$: BASE-POINT SAMPLING FREQUENCY)

POWER SPECTRUM OF TRANSMISSION SIGNAL

SPECTRUM AMPLITUDE CHARACTERISTICS OF TRANSMISSION CHANNEL AND EQUALIZER (WITH NOTCH)

EYE DIAGRAM OF EQUALIZER OUTPUT (4QAM N=10 Nmax=16)

POWER SPECTRUM OF TRANSMISSION SIGNAL
($P(D)=1$, $F_1(D)=1$, WITH FIXED NOTCH)

POWER SPECTRUM OF TRANSMISSION SIGNAL
(WITH PEAK RESTRICTION $P(D)$, WITH FIXED NOTCH)

PEAK RESTRICTION CHARACTERISTIC

IMPULSE RESPONSE (REAL PART) OF $F_1(D)$ WITH PEAK RESTRICTION

IMPULSE RESPONSE (IMAGINARY PART) OF $F_1(D)$ WITH PEAK RESTRICTION

SPECTRUM OF RECEPTION SIGNAL WITH PEAK RESTRICTION AND FIXED NOTCH

IMPULSE RESPONSE (REAL PART) OF $F_2(D)$ WITH PEAK RESTRICTION

IMPULSE RESPONSE (IMAGINARY PART) OF $F_2(D)$ WITH PEAK RESTRICTION

DATA TRANSMITTING METHOD AND DATA TRANSMITTING APPARATUS

CROSS REFERENCE TO RELATED APPLICATIONS

This application is entitled to the benefit of and incorporates by reference essential subject matter disclosed in International Patent Application No. PCT/JP2007/052451 filed on Feb. 13, 2007; Japanese Patent Application No. 2006-045746 filed Feb. 22, 2006; and Japanese Patent Application No. 2006-117295 filed Apr. 20, 2006.

TECHNICAL FIELD

The present invention relates to a data transmitting method and a data transmitting apparatus in which data is transmitted at a reduced transmission symbol rate through a transmission channel with low transmission quality, for example, a transmission channel in which an attenuation band is wide and noise equivalent to signal power is added.

BACKGROUND ART

In recent years, PLC (Power Line Communication) data communication system in which a power line for commercial power supply is used to bidirectionally connect between electrical appliances has attracted attention at home or in office.

In this system, a power-line communication apparatus is set at an arbitrary position in indoor wiring, and data is transmitted via a coupling circuit provided in this communication apparatus, thereby performing data communication between communication apparatuses and between a communication apparatus and an external communication apparatus. An outdoor power line is connected to the indoor wiring via a filter that passes only an alternating current of, for example, several hundreds of Hz or less. A parent MODEM is connected to the indoor wiring, and the parent MODEM has a router function and is connected to the Internet (server) via an optical terminal device, an optical fiber line, and others.

The indoor wiring is branched at an arbitrary position and connected to arbitrary loads such as a personal computer, a television, a refrigerator, and other electrical appliances via sockets and switches. Some of these electrical appliances have a child MODEM and perform data communication with the parent MODEM or other child MODEM via the indoor wiring by using, for example, a predetermined band in a shortwave band.

The indoor wiring is branched at a socket, and the line length and the terminal impedance thereof are changed when a new load is connected to or removed from the socket or when an arbitrary load is turned ON/OFF. Therefore, signal reflection and resonance occur in accordance with the line length to the branching point or the terminal, the terminal impedance, and others.

For this reason, in the indoor wiring, attenuation sometimes occurs over a wide band in the use band or no signal is transmitted at a specific frequency (spectrum-null point) in some cases. Moreover, the frequency spectrum of the transmission path is frequently changed depending on the load state and other factors.

Furthermore, as another problem in the indoor wiring, not only noise generated from a load but also an interference signal and noise induced by the resonance of the indoor wiring serving as an antenna with an electromagnetic wave in the air are added at a level equivalent to that of the signal power.

As the above-described PLC data communication system, the system performing the communication by OFDM (Orthogonal Frequency Division Multiplexing) has been proposed (refer to Japanese Patent Application Laid-Open Publication No. 2003-188781).

In this OFDM transmission scheme, however, if roll-off of a transmission pulse is decreased in order to increase frequency use efficiency, the length of a guard interval signal is increased, and the transmission efficiency is disadvantageously decreased. Further, since the OFDM transmission scheme is a block transmission scheme, blocks have to be reassembled at the time of fluctuations in the transmission path, and quick response is difficult.

Furthermore, as a generally known technology, when the characteristic of the transmission channel becomes deteriorated, a fallback mode is adopted to decrease a data transmission rate (refer to Japanese Patent Application Laid-Open Publication No. 2000-22771).

In this technology, however, the number of signal points forming one symbol (the number of modulation multi-values in digital modulation) is decreased or the same symbol is repeatedly transmitted. Therefore, when the transmission quality is decreased, fallback is performed without considering the spectrum amplitude of the transmission channel.

DISCLOSURE OF THE INVENTION

An object of the present invention is to solve the problems mentioned above and to provide a data transmitting method in which, for a transmission channel with low transmission quality, data transmission is performed at a transmission symbol rate lower than a base-point symbol rate by using a wide use band at the base-point symbol rate, and a data transmitting apparatus used for this data transmitting method.

A data transmitting method according to the present invention comprises the steps of: inputting a transmission symbol data at a transmission symbol rate which is one-Nth (N is an integer of 2 or more) of a base-point symbol rate to create a transmission symbol waveform at the base-point symbol rate; transmitting the transmission symbol waveform through a roll-off filter having a band corresponding to the base-point symbol rate; inputting a reception signal to a fractionally-spaced equalizer that operates at the base-point symbol rate and is forcibly equalized at the transmission symbol rate by using a reference signal; and determining a level of a signal output from the fractionally-spaced equalizer at the transmission symbol rate, thereby outputting a reception symbol data.

The first data transmitting apparatus according to the present invention is a data transmitting apparatus used for the data transmitting method and creating a transmission symbol waveform at the base-point symbol rate by a precoder and a correlator. On a reception side, by obtaining a sawtooth function output of a level-determined symbol data, a reception symbol data is output.

More specifically, the precoder has a sawtooth-function output unit, and once in N times of a base-point symbol timing corresponding to the base-point symbol rate, the transmission symbol data is input, one obtained by passing an output of the sawtooth-function output unit through a filter with a transmission function $F_1(D)-1$ is subtracted from the input transmission symbol data and is then input to the sawtooth-function output unit, and an output of the sawtooth-function output unit is taken as an output symbol data of the precoder, and in a base-point symbol timing that does not input the transmission symbol data, zero symbol data is output to the filter with the transmission function $F_1(D)-1$ and is taken as the output symbol data of the precoder.

The correlator adds the output symbol data of the precoder and one obtained by passing the output symbol data though a filter with the transmission function $F_1(D)-1$ to take the addition result as an output symbol data of the correlator, thereby creating the transmission symbol waveform.

Here, the transmission function $F_1(D)$ is set so that a channel passage rate of a spectrum energy of a transmission signal is increased.

Note that, since the filter used in the precoder and the filter used in the correlator have the same transmission function, the same filter can be used in common or different filters can be used respectively.

The second data transmitting apparatus according to the present invention is a data transmitting apparatus used for the data transmitting method and creating a transmission symbol waveform at the base-point symbol rate by a precoder. On a reception side, by obtaining a sawtooth function output of a level-determined symbol data, a reception symbol data is output.

More specifically, the precoder has a sawtooth-function output unit, and once in N times of a base-point symbol timing corresponding to the base-point symbol rate, the transmission symbol data is input, one obtained by passing an output of the sawtooth-function output unit through a filter with a transmission function $F_2(D)-1$ is subtracted from the input transmission symbol data and is then input to the sawtooth-function output unit, and an output of the sawtooth-function output unit is taken as an output symbol data of the precoder, and in a base-point symbol timing that does not input the transmission symbol data, zero symbol data is output to the filter with the transmission function $F_2(D)-1$ and is taken as the output symbol data of the precoder, thereby creating the transmission symbol waveform, and the transmission function $F_2(D)$ is set so that a signal-to-noise ratio is improved by controlling a band selection characteristic of the fractionally-spaced equalizer.

The third data transmitting apparatus according to the present invention has the same correlator as that of the first data transmitting apparatus, and the precoder thereof has a sawtooth-function output unit, and once in N times of a base-point symbol timing corresponding to the base-point symbol rate, the transmission symbol data is input, one obtained by passing an output of the sawtooth-function output unit through a filter with a transmission function $F_1(D)F_2(D)-1$ is subtracted from the input transmission symbol data and is then input to the sawtooth-function output unit, and an output of the sawtooth-function output unit is taken as an output symbol data of the precoder, and in a base-point symbol timing that does not input the transmission symbol data, zero symbol data is output to the filter with the transmission function $F_1(D)F_2(D)-1$ and is taken as the output symbol data of the precoder.

Here, the transmission function $F_1(D)$ is set in a manner similar to that of the first data transmitting apparatus, and the transmission function $F_2(D)$ is set in a manner similar to that of the second data transmitting apparatus.

Note that, since the filter used in the precoder and the filter used in the correlator have transmission functions partially identical to each other, a part of the filters can be used in common.

Also, in each data transmitting apparatus described above, fallback control means that determines the value of N depending on deterioration of transmission quality may be provided.

This fallback control means sets an absolute value $|F_1(D)|$ of the transmission function $F_1(D)$ so that the absolute value is closer to 1 as the determined value of N is closer to 1 and so that the absolute value is closer to an amplitude characteristic $|H(D)|$ of the transmission channel as the determined value of N is increased. Also, the fallback control means sets an absolute value $|F_2(D)|$ of the transmission function $F_2(D)$ so that the absolute value is closer to the amplitude characteristic $|H(D)|$ of the transmission channel as the determined value of N is closer to 1 and so that the absolute value is closer to 1 as the determined value of N is increased.

Furthermore, in the first and third data transmitting apparatuses, a transmission function of a notch filter is defined as $N(D)$ and the transmission function $F_1(D)$ in the precoder and the correlator is replaced by a transmission function $N(D)F_1(D)$, thereby providing a notch characteristic to a spectrum energy of the transmission signal.

The fourth data transmitting apparatus according to the present invention is a data transmitting apparatus used for a data transmitting method including the steps of: inputting a transmission symbol data at a transmission symbol rate which is one-Nth (N is an integer of 2 or more) of a base-point symbol rate to create a transmission symbol waveform at the base-point symbol rate by a precoder and a correlator; transmitting the transmission symbol waveform through a roll-off filter having a band corresponding to the base-point symbol rate; inputting a reception signal to a fractionally-spaced equalizer that operates at the base-point symbol rate and is forcibly equalized at the transmission symbol rate by using a reference signal; determining a level of a signal output from the fractionally-spaced equalizer at the transmission symbol rate; and obtaining a sawtooth function output of a level-determined symbol data, thereby outputting a reception symbol data, wherein the precoder has a sawtooth-function output unit, and once in N times of a base-point symbol timing corresponding to the base-point symbol rate, the transmission symbol data is input, one obtained by passing an output of the sawtooth-function output unit through a filter with a transmission function $N(D)F_2(D)-1$ is subtracted from the input transmission symbol data and is then input to the sawtooth-function output unit, and an output of the sawtooth-function output unit is taken as an output symbol data of the precoder, and in a base-point symbol timing that does not input the transmission symbol data, zero symbol data is output to the filter with the transmission function $N(D)F_2(D)-1$ and is taken as the output symbol data of the precoder, and the correlator adds the output symbol data of the precoder and one obtained by passing the output symbol data though a filter with the transmission function $N(D)-1$ to take the addition result as an output symbol data of the correlator, thereby creating the transmission symbol waveform, the $N(D)$ is a transmission function of a notch filter for providing a notch characteristic to a spectrum energy of a transmission signal, and the transmission function $F_2(D)$ is set so that the fractionally-spaced equalizer serves as a phase equalizer.

Therefore, the data transmitting apparatus is suitable for the case where a uniform peak restriction is provided for the power spectrum of the transmission signal as transmission standards, and the amplitude equalization characteristic of the equalizer can be flattened and equalization capability can be improved.

The transmission function $F_2(D)$ is set so that, when a transmission function of the transmission channel is defined as $H(D)$, a spectrum amplitude $|N(D)H(D)|$ of $N(D)H(D)$ is closer to $|N(D)|\|F_2(D)|$ or a spectrum amplitude $|H(D)|$ of the transmission function $H(D)$ is closer to $|F_2(D)|$.

The fifth data transmitting apparatus according to the present invention is a data transmitting apparatus used for a data transmitting method including the steps of: inputting a transmission symbol data at a transmission symbol rate which is one-Nth (N is an integer of 2 or more) of a base-point symbol rate to create a transmission symbol waveform at the base-point symbol rate by a precoder and a correlator; transmitting the transmission symbol waveform through a roll-off filter having a band corresponding to the base-point symbol rate; inputting a reception signal to a fractionally-spaced equalizer that operates at the base-point symbol rate and is forcibly equalized at the transmission symbol rate by using a reference signal; determining a level of a signal output from the fractionally-spaced equalizer at the transmission symbol rate; and obtaining a sawtooth function output of a level-determined symbol data, thereby outputting a reception symbol data, wherein the precoder has a sawtooth-function output unit, and once in N times of a base-point symbol timing corresponding to the base-point symbol rate, the transmission symbol data is input, one obtained by passing an output of the sawtooth-function output unit through a filter with a transmission function $N(D)F_1(D)F_2(D)-1$ is subtracted from the input transmission symbol data and is then input to the sawtooth-function output unit, and an output of the sawtooth-function output unit is taken as an output symbol data of the precoder, and in a base-point symbol timing that does not input the transmission symbol data, zero symbol data is output to the filter with the transmission function $N(D)F_1(D)F_2(D)-1$ and is taken as the output symbol data of the precoder, and the correlator adds the output symbol data of the precoder and one obtained by passing the output symbol data though a filter with the transmission function $N(D)F_1(D)-1$ to take the addition result as an output symbol data of the correlator, thereby creating the transmission symbol waveform, and the $N(D)$ is a transmission function of a notch filter for providing a notch characteristic to a spectrum energy of a transmission signal, and an amplitude characteristic of the transmission function $F_1(D)$ is set to be close to a peak restriction characteristic of a power spectrum of the transmission signal, and the transmission function $F_2(D)$ is set so that the fractionally-spaced equalizer serves as a phase equalizer.

Therefore, the data transmitting apparatus is suitable for the case where a peak restriction is provided for the power spectrum of the transmission signal as the transmission standards, and the amplitude equalization characteristic of the fractionally-spaced equalizer can be flattened and equalization capability can be improved.

The transmission function $F_1(D)$ is set so that, when a transmission function of the transmission channel is defined as $H(D)$ and a peak restriction characteristic of a spectrum amplitude of the transmission signal is defined as $P(D)$, a spectrum amplitude $|N(D)F_1(D)|$ of $N(D)F_1(D)$ is closer to $|N(D)||P(D)|$ or a spectrum amplitude $|F_1(D)|$ of $F_1(D)$ is closer to $|P(D)|$.

The transmission function $F_2(D)$ is set so that, when a transmission function of the transmission channel is defined as $H(D)$, a spectrum amplitude $|N(D)H(D)|$ of $N(D)H(D)$ is closer to $|N(D)||F_2(D)|$ or an amplitude $|H(D)|$ of the transmission function $H(D)$ is closer to $|F_2(D)|$.

In the data transmitting method according to the present invention, the following effect can be achieved.

At the time of transmission at a low transmission symbol rate, a transmission signal is transmitted by using a wide band, and further, by using a fractionally-spaced equalizer, the equalizer can naturally select a band in good condition from a transmission channel, and the SNR can be improved.

Also, in the data transmitting apparatus according to the present invention, the following effects can be further achieved.

Since a correlator is used to shape a transmission spectrum, a transmission channel passage rate of spectrum energy of the transmission signal can be improved.

Since a precoder is used to control the band selection characteristic of the equalizer, the SNR can be improved.

In addition, the transmission spectrum can be freely shaped in accordance with required specifications, for example, the setting of the notch frequency.

Even when a uniform peak restriction characteristic or non-uniform peak restriction is provided for the transmission power spectrum as transmission standards, the characteristic of the precoder and the characteristic of the correlator can be adapted.

BEST MODE FOR CARRYING OUT THE INVENTION

Embodiments of the present invention will be described below with reference to the drawings.

Figure 1:
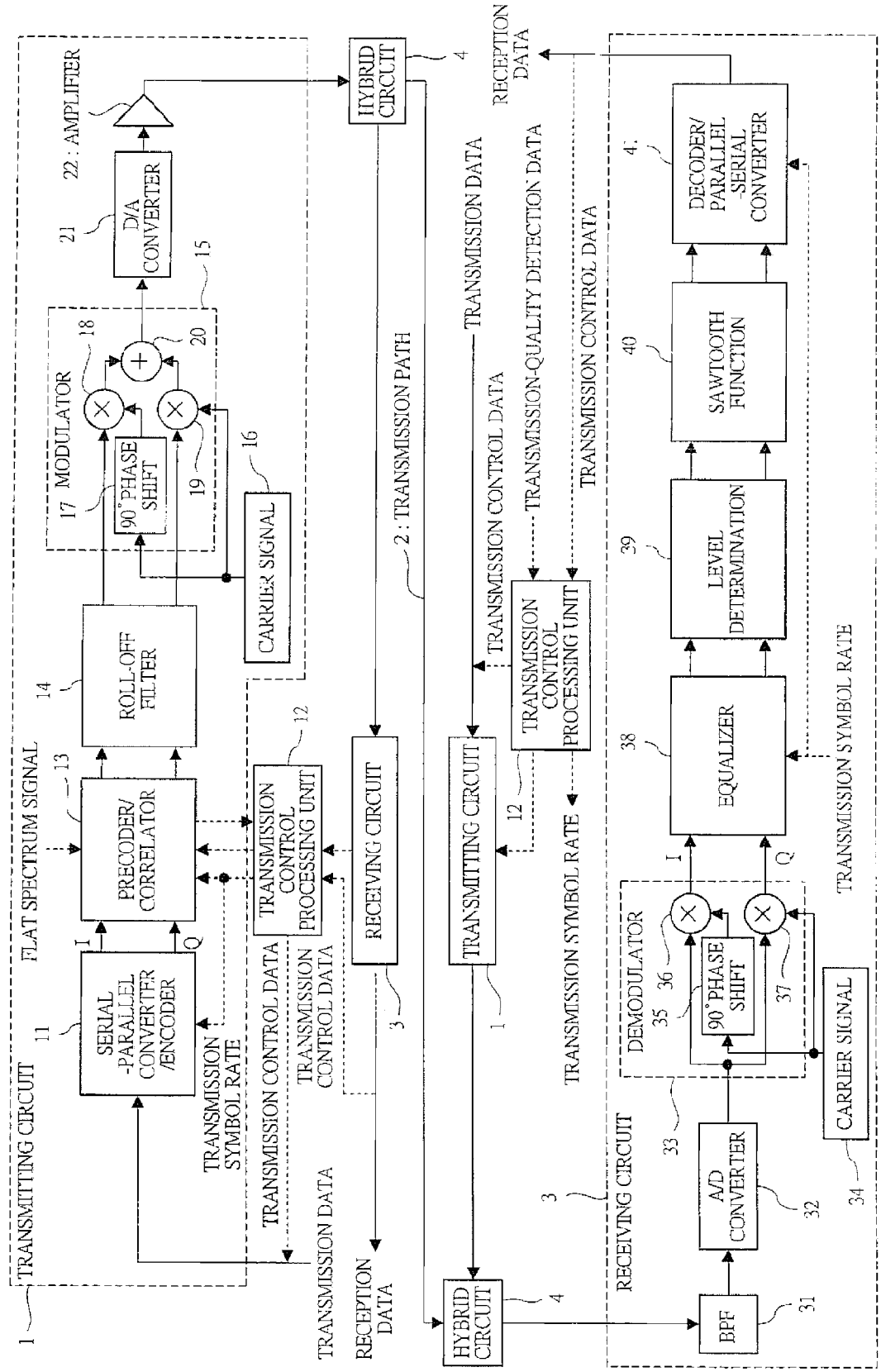
FIG. 1 is a block diagram of the entire configuration of a PLC data communication system, which exemplifies a data transmission method according to the present invention.

FIG. 1 is a block diagram showing the entire configuration of a PLC data communication system, which exemplifies a data transmission method according to the present invention. Data transmitting apparatuses (parent MODEM, child MODEM) are connected to both ends of a transmission path 2 (indoor wiring).

The one data transmitting apparatus (PLC terminal) is shown in an upper portion of FIG. 1, and the other data transmitting apparatus having the same configuration is shown in a lower portion thereof. Each data transmitting apparatus has a transmitting circuit 1 and a receiving circuit 3 connected to the transmission path 2 via a hybrid circuit 4. Details of the transmitting circuit 1 will be described by referring to the data transmitting apparatus in the upper portion, and those of the receiving circuit 3 will be described by referring to the data transmitting apparatus in the lower portion.

In the transmitting circuit 1, transmission data is converted to a parallel signal by a serial-parallel converter/encoder unit 11 and is further converted to I-phase data and Q-phase data in accordance with the modulation scheme to be used and then output.

In the following description, the case where 4QAM (Quadrature Amplitude Modulation) is used and a mode in which the serial-parallel converter/encoder unit 11 performs transmission at a transmission symbol rate (symbol rate) of 22.5 [Msymbol/s] is used as a "base point" will be described. In this case, the transmission data is parallelized to 2 bits and is encoded to (1, 1), (1, −1), (−1, −1), and (−1, 1). The data transmission rate is 45 [Mbit/s].

When the transmission path 2 is in good condition, the number of multi-values of the symbol is increased from this "base point" to increase the data transmission rate from 4QAM to 16QAM and 64QAM. On the other hand, in order to allow reliable communication even for a poor transmission path that cannot perform the transmission even at a transmission rate of the "base point", fallback control in which the transmission symbol rate is sequentially decreased (the data transmission rate is accordingly decreased) is performed.

In the present embodiment, in a fallback mode, the transmission symbol rate is not just decreased, but an equalizer naturally selects a band having less signal attenuation from transmission channel bands, thereby improving the SNR.

Further, in the present embodiment, by using the "generalized correlation symbol transmission scheme" (FIGS. 2 and 3) described further below, the spectrum of the transmission signal is shaped so that a channel passage rate of the transmission signal is increased. Also, the band selection characteristic of the equalizer is controlled so that the SNR is improved.

In this "generalized correlation symbol transmission scheme", a precoder/correlator 13 is used. The details thereof will be described with reference to FIG. 5.

A discrete signal system from the precoder/correlator 13 to a D/A converter 21 processes a discrete signal at a sampling frequency (22.5 MHz) having a value equal to the transmission symbol rate at the "base point" even in a fallback control mode.

Therefore, the precoder/correlator 13 operates at a predetermined base-point symbol rate, but it inputs I-phase data and Q-phase data from the serial-parallel converter/encoder unit 11 at a reduced transmission symbol rate and outputs the data to a roll-off filter 14 after performing preliminary coding and correlation processing. The preliminary coding and correlation processing are changed depending on the reduced transmission symbol rate.

The roll-off filter 14 operates at the base-point symbol rate, individually restricts the spectrums of the input I-phase data and Q-phase data to a frequency band (sampling frequency) corresponding to the base-point symbol rate, shapes these spectrums so as not to cause intersymbol interference by band restriction, and outputs the same to a modulator 15 at the base-point symbol rate.

The modulator 15 includes multipliers 18 and 19, a phase shifter 17, and an adder 20, and performs quadrature modulation by multiplying input data by a carrier signal 16. An output signal of the modulator 15 is converted by a D/A converter 21 to an analog signal, and the analog signal is amplified by an amplifier 22 and output as a transmission signal to the transmission path 2 via the hybrid circuit 4.

In the receiving circuit 3, a reception signal passing through a BPF (band-pass filter) 31 is converted by an ND converter 32 to a digital value and is then output to a demodulator 33. A discrete signal system from the ND converter 32 to an equalizer 38 processes a discrete signal at a sampling frequency (22.5 MHz) corresponding to the symbol rate at the "base point" even in the fallback control mode.

The demodulator 33 includes multipliers 36 and 37 and a phase shifter 35, performs quadrature demodulation by multiplying input data by a carrier signal 34, and outputs I-phase data and Q-phase data to the equalizer 38.

The equalizer 38 performs a filter process at the base-point symbol rate even in the fallback control mode, but it is forcibly equalized at a reduced transmission symbol rate by using a reference signal (target for forcible equalization) and outputs the equalized signal at the transmission symbol rate. Therefore, the equalizer 38 operates as a fractionally-spaced equalizer.

A level determining unit 39 individually compares the I-phase data and the Q-phase data output from the equalizer 38 at the transmission symbol rate with a plurality of thresholds, thereby performing level determination, and outputs the resultant data to a sawtooth-function output unit 40 after removing the influences of level fluctuations due to noise and distortion of the transmission path to some degree. The level determining unit 39 performs level determination individually on the I-phase data and the Q-phase data (two-dimensional level determination). Note that the output of the equalizer 38 may be first passed through the sawtooth-function output unit 40 and then be supplied to the level determining unit 39 where the level determination is performed.

The sawtooth-function output unit 40 obtains a sawtooth-function output of the I-phase data and the Q-phase data subjected to level determination, thereby obtaining reception symbol data. Details will be described further below with reference to FIG. 2. Note that the precoder/correlator 13 of the transmitting circuit 1 is also provided with the same unit as the sawtooth-function output unit 40. In principle, this reception symbol data is equal to the I-phase data and the Q-phase data output from the serial-parallel converter/encoder unit 11 of the transmitting circuit 1. A decoder/parallel-serial converter unit 41 performs decoding reverse to the encoding of the serial-parallel converter/encoder unit 11, thereby outputting reception data equal to the transmission data input by the transmitting circuit 1. Although not shown, an error detection/correction processing function is present in the subsequent stage to output error rate data.

In the above, the operation during data transmission has been described. Next, an initialization protocol will be described.

To establish communication, a low-rate channel allowing reliable communication is provided (for example, about several tens to several hundreds of kbps). A transmission control processing unit 12 uses this channel to transmit and receive the transmission control data, thereby executing an initialization protocol.

For example, when a PN-series repetition signal is transmitted at a transmission symbol rate to be a base point, and on a reception side, forcible equalization of the equalizer 38 is successful (eye pattern is open), a communication start request is made, and when forcible equalization fails (eye pattern is not open), deceleration is requested.

On the other hand, when the transmission symbol rate is to be changed during communication by transmission quality detection such as error rate detection, a complicated protocol of reassembling blocks such as a sub-carrier masking or bit allocation is required for each rate change in an OFDM-series communication scheme.

By contrast, in the present invention, a command for deceleration or acceleration is sent from a reception side to a transmission side. The transmission side simply receives the command and inserts a command by which the reception side can recognize a rate switching time, into a data frame.

In the present invention, the transmission control processing unit 12 is required to estimate in advance a channel amplitude characteristic of the transmission path 2 with all transmission counterparts.

Therefore, in a vacant time in which no communication is performed between the data transmitting apparatuses (in a time zone where no communication frame is present in a transmission path), each data transmitting apparatus sends a flat spectrum signal in a round-robin manner (however, in order to prevent interference with other communication systems, the signal is passed through a notch filter that removes a spectrum of a band used by the other communication systems). Then, in a data transmitting apparatus on a reception side, a channel amplitude characteristic with a specific data transmitting apparatus on a transmission side is estimated, a filter characteristic in the precoder/correlator 13 on the transmission side is determined, and a filter characteristic data is transferred to the data transmitting apparatus on the transmission side by using the low-rate channel. Alternatively, if possible, the channel amplitude characteristic of the transmission path 2 may be estimated in a preamble section of a transmission data frame.

The transmission control processing unit 12 of each data transmitting apparatus stores the filter characteristics of all transmission counterparts while sequentially updating them. Further, since the reference signal for use in the equalizer 38 (target for forcible equalization) is determined by the filter characteristic in the precoder/correlator 13 and the pattern of the transmission data, these data are also stored.

Still further, the equalizer 38 is required to intermittently correct a tap gain by using the reference signal. Therefore, a training signal is transmitted in a preamble section of a transmission data frame, and the equalizer 38 performs an error comparison between an output obtained by equalizing this training signal and the reference signal, thereby controlling the tap gain and performing the forcible equalization.

Prior to describing details of the precoder/correlator 13 in the signal transmission system shown in FIG. 1, the principle of "generalized correlation symbol transmission" will be described. The "generalized correlation symbol transmission" is the transmission scheme obtained by generalizing a known correlation code transmission scheme such as duo binary or partial response.

FIG. 2 is an explanatory diagram of the generalized correlation symbol transmission.

Figure 2A:
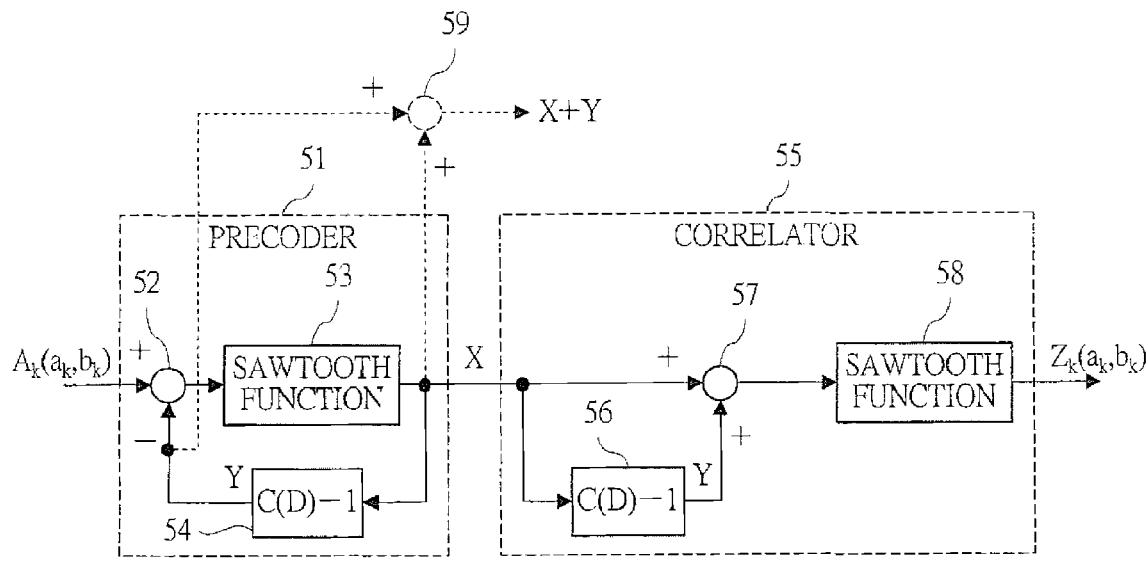
FIG. 2 is an explanatory drawing of the generalized correlation symbol transmission)
Figure 2B:
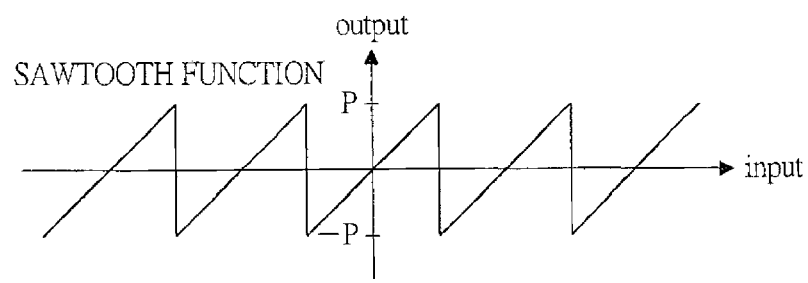

FIG. 2A is a functional block diagram, and FIG. 2B is a drawing of an input/output characteristic defining a sawtooth function output unit.

In FIG. 2A, $a_k$ denotes I-phase data of a transmission data symbol $A_k$, and $b_k$ denotes Q-phase data thereof. With using $(a_k, b_k)$ as complex numbers, a complex number operation process is performed.

In an adder 52 of a precoder 51, an output of a feedback filter 54 (transmission function: C(D)−1) is subtracted from the transmission data symbol $A_k$ and then input to a sawtooth-function output unit 53. The sawtooth-function output unit 53 individually performs an input/output operation for the I-phase data $a_k$ and the Q-phase data $b_k$.

Here, D (delay operator) is $D=e^{-j2\pi fT}$, and T represents a base-point sampling cycle (inverse of a base-point sampling frequency) corresponding to a transmission symbol rate to be a base point of the fallback.

The sawtooth-function output unit 53 has an input/output characteristic shown in FIG. 2B.

In this specification, a "sawtooth function" is a periodic function having a constant gradient passing through an origin (0, 0) and a linear function taking output values of −P or more and less than +P as a basic cycle.

When the gradient of the linear function is assumed to be 1, an integral multiple of 2P (width of the range) is subtracted from or added to an input value, thereby outputting those whose output value is within ±P (range). Mathematically, the function is expressed by modulo arithmetic and addition and subtraction of an offset. But practically, a reference table is used to obtain a sawtooth function output.

In an example shown in a lower portion of FIG. 2B, the I-phase data $a_k$ and the Q-phase data $b_k$ of the transmission symbol respectively take integer values other than zero and within the range of 2P in accordance with the value of an I-phase component and the value of a Q-phase component that set a signal point of a digital modulation scheme.

An output of the sawtooth-function output unit 53 is supplied to the feedback filter 54, and is also an output of the precoder 51.

The output of the precoder 51 is input to a correlator 55 and is supplied to an adder 57 and a filter 56 (transmission function: C(D)−1) thereof. The output of the precoder 51 and an output of the filter 56 are added together by the adder 57 and then output to a sawtooth-function output unit 58. The sawtooth-function output unit 58 has an input/output characteristic identical to that of the sawtooth-function output unit 53.

As illustrated, when the transmission function of the feedback filter 54 and the transmission function of the filter 56 are identical to each other, the correlator 55 and the precoder 51 become inverse circuits. As a result, reception symbol data $Z(a_k, b_k)$ that matches input transmission symbol data $A(a_k, b_k)$ is output from the correlator 55.

The reason for this is as follows.

When f is taken as the sawtooth function, X is taken as the output of the precoder, Y is taken as an output of the filters 54 and 56, and Z is taken as an output of the correlator 55, X=f(A−Y) and Z=f(X+Y) are satisfied.

From the property of the sawtooth function, the equation of Z can be developed as follows.

$$Z=f(X+Y)=f(f(A-Y)+Y)=f(f(A))-f(f(Y))+f(Y)=f(A)$$

Here, if A is within the range of −P or more and less than +P, f(A)=A, and therefore, Z=A.

Note that the input (X+Y) of the sawtooth-function output unit 58 in the correlator 55 matches an output of the adder 59 on a precoder 51 side shown in the drawing.

The amplitude of output symbol data of the precoder 51 is suppressed and randomized (spectrum is flattened) by the sawtooth-function output unit 53.

With regard to the output data of the adder 57, the range of level changes is increased by the adder 57, and input random symbol data is spectrum shaped so as to correspond to a transmission function C(D).

For example, when a notch filter characteristic N(D) having a notch at a desired frequency is set as the transmission function C(D), the spectrum amplitude of symbol data output from the correlator 55 becomes a signal which has a notch (spectrum-null point) at the specific frequency.

As an application example of the generalized correlation symbol transmission scheme, it is possible to employ the configuration in which the components up to the adder 57 are provided to a transmitting circuit side so that a modulation is performed and the transmission signal is passed to the transmission path, and in the receiving circuit, the reception signal is demodulated and then passed to the sawtooth-function output unit 40.

Furthermore, since it is sufficient if the transmission function up until just before the sawtooth function output unit 58 in the correlator 55 is C(D), the component that provides the transmission function C(D) is not limited to the correlator 55, and C(D) may include a channel characteristic of the transmission path.

The embodiment described with reference to FIG. 1 is premised on the above-described generalized correlation symbol transmission scheme.

In the embodiment shown in FIG. 1, the sawtooth-function output unit 58 of FIG. 2 is put out of the precoder/correlator 13 and is placed as the sawtooth-function output unit 40 on a reception side.

Also, in the transmitting circuit 1, the roll-off filter 14 that restricts the frequency spectrum of the transmission signal to a use-permitted frequency band and eliminates intersymbol interference is inserted. In the receiving circuit 3, in order to remove the level fluctuations due to noise and unequalized intersymbol interference and others, the level determining unit 39 is inserted immediately before the sawtooth-function output unit 40.

Figure 3:
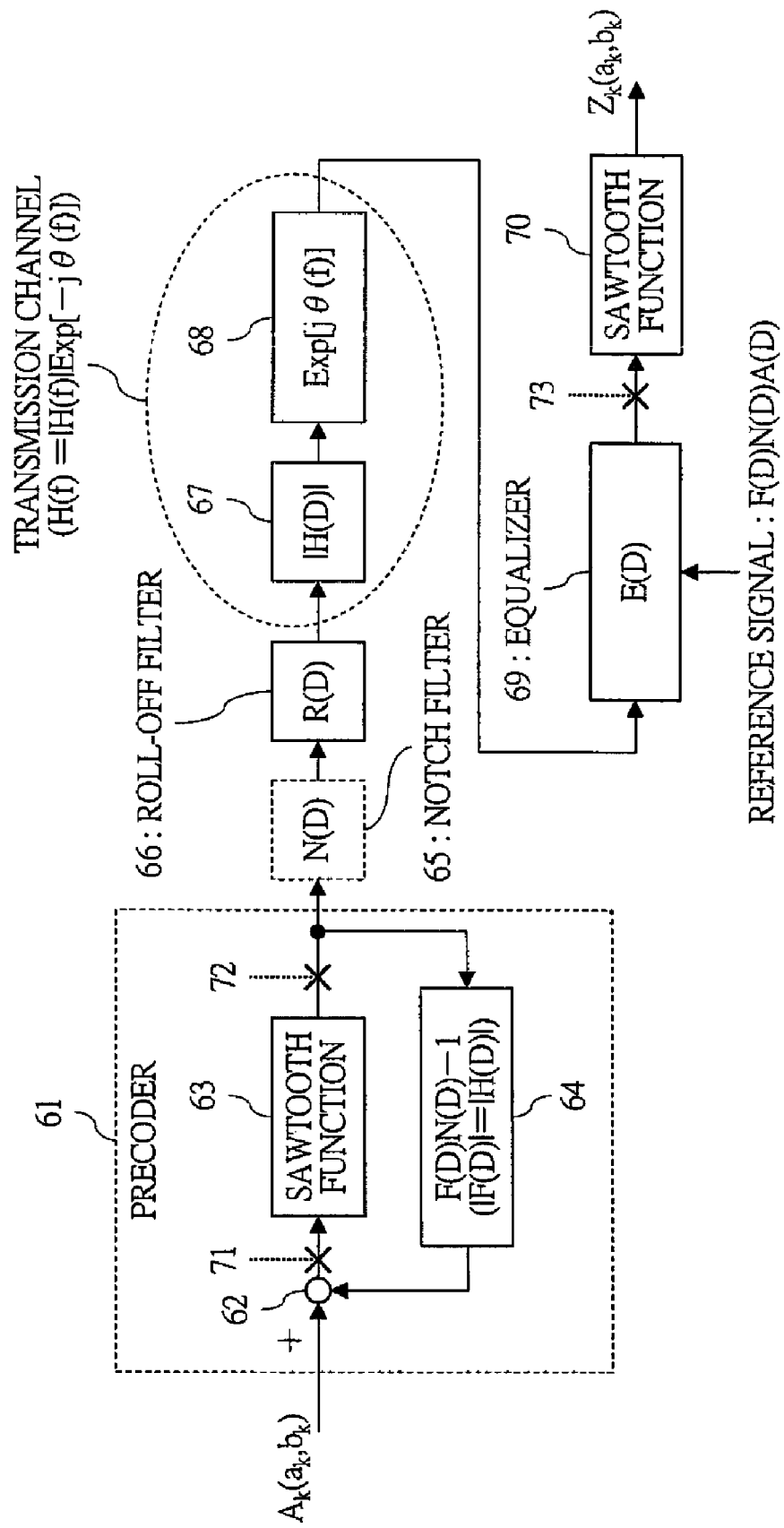
FIG. 3 is a block diagram conceptually showing the data transmission system shown in FIG. 1, which serves as a base point for fallback.

FIG. 3 is a block diagram conceptually showing the data transmission system shown in FIG. 1 to be a base point of fallback.

In the drawing, 61 denotes a precoder, 62 denotes an adder, 63 denotes a sawtooth-function output unit, 64 denotes a feedback filter, 65 denotes a notch filter (transmission function N(D)), and 66 denotes a roll-off filter (transmission function R(D)).

In an application example to a PLC data communication system, in order to eliminate a transmission spectrum component in an amateur radio band included in the use frequency band, the fixed notch filter 65 configured of, for example, an IIR filter and forming a frequency where output is rapidly decreased (null point) is inserted.

In general, when a transmission spectrum is to be shaped, a filter corresponding to a waveform spectrum is inserted.

The transmission function of the transmission channel is defined as H(D). Here, for convenience, the transmission function of the transmission channel is expressed as being divided into a spectrum amplitude and a spectrum phase as follows.

$$H(D)=|H(D)|\mathrm{Exp}[j\theta(f)] \quad (1).$$

More specifically, it is expressed by the configuration in which a filter 68 with the spectrum phase of the transmission channel is connected to the filter 67 with the spectrum amplitude of the transmission channel and a zero phase.

69 denotes an equalizer, and it is controlled so as to equalize only the phase characteristic of the transmission channel. When the equalization is perfect, the transmission function of the equalizer 69 is $\mathrm{Exp}[-j\theta(f)]$. 70 denotes a sawtooth-function output unit.

A path from the notch filter 65 to the sawtooth-function output unit 70 in FIG. 3 corresponds to the correlator 55 of FIG. 2. However, the roll-off filter 66 is negligible because it just restricts the use band so as to eliminate intersymbol interference. Also, as described above, the characteristic of the filter 68 and the characteristic of the equalizer 69 are cancelled out each other. Therefore, the transmission function of the path described above is N(d)|H(D)|.

With reference to FIG. 2, when the transmission function of the feedback filter 64 is (N(D)|H(D)|−1), the correlator and the precoder have inverse functions, and therefore, the transmission symbol data $A_k$ matches the reception symbol data $Z_k$.

Here, since the results are the same even if the transmission function F(D) that satisfies the following equation (2) is used, the feedback filter 64 uses F(D) satisfying |F(D)|=|H(D)| to obtain F(D)N(D)−1.

$$|F(D)|=|H(D)| \quad (2).$$

The reference signal used for the forcible equalization of the equalizer 69 corresponds to an output signal of the equalizer 69 when the equalizer 69 performs perfect equalization (that is, an input signal of the sawtooth-function output unit 70).

As described with reference to FIG. 2, since the input symbol data of the sawtooth-function output unit 58 is equal to the output symbol data of the adder 59, if the transmission symbol data is expressed as A(D), A(D)F(D)N(D) is obtained, and it becomes the reference signal.

Since the amplitude characteristic of the equalizer 69 is flat, if the amplitude of the transmission signal and the noise amplitude are constant with respect to the frequency in the use band, the equalizer 69 merely removes the intersymbol interference and neither emphasizes the transmission signal nor suppresses the noise at that time.

Figure 4:
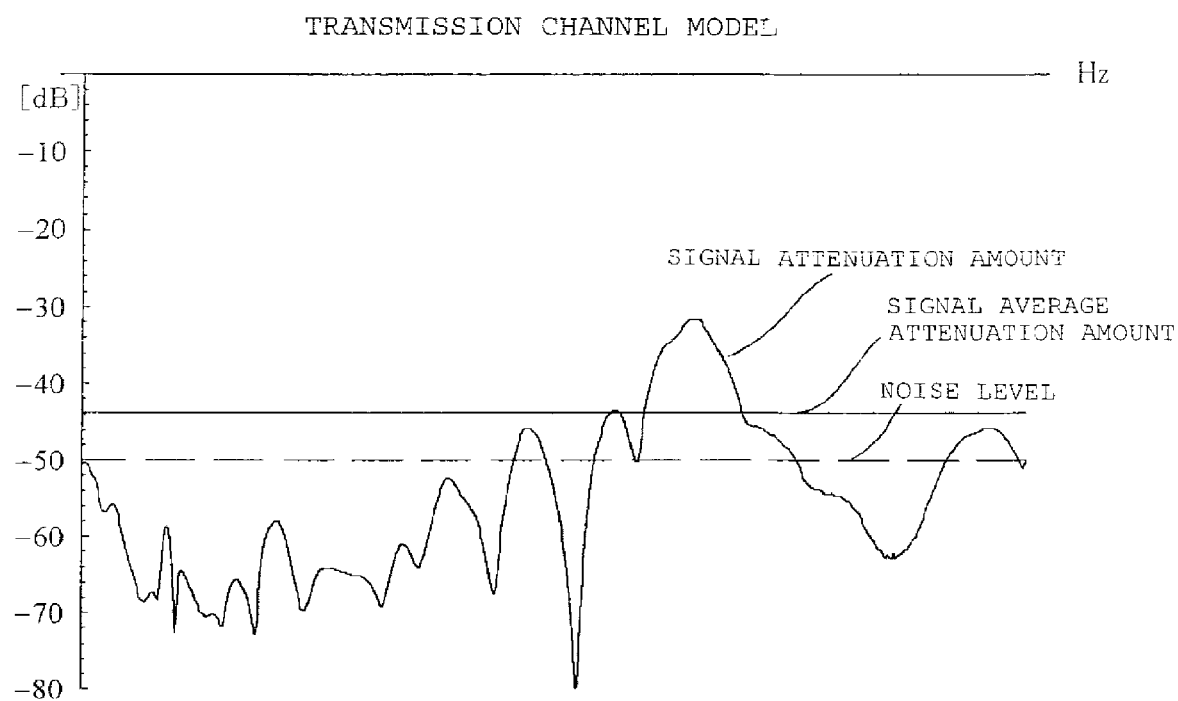
FIG. 4 is a graph of spectrum amplitude characteristics of a transmission channel in the PLC data communication system.

FIG. 4 is a graph of attenuation characteristics of a transmission channel in the PLC data communication system. This is the case of a transmission path including a so-called "starburst connection" in which the transmission quality is worst.

In the drawing, the horizontal axis represents frequency [Hz] and a range of use frequency band (3.75 MHz to 26.25 MHz) is shown. The vertical axis represents signal attenuation amount, noise level, and signal average attenuation amount [dB].

As can be understood from the graph, although the signal attenuation amount is uneven and the use band partially includes a band where the signal attenuation amount is smaller than the noise level, since the signal drops over a wide range, the signal average attenuation amount is close to the noise level though it is smaller than the noise level. There might be a case where the signal average attenuation amount is equal to the noise level.

For this reason, when performing the fallback control, effects more than the reduction of intersymbol interference by reducing the transmission symbol rate cannot be obtained unless the above-described channel state is taken into consideration.

With the conceptual drawing shown in FIG. 3 in mind and with reference to FIGS. 1 and 5, the operation will be described in which, in a fallback mode, the equalizer naturally selects a band with less signal attenuation to improve the SNR, a channel passage rate of the transmission signal is improved by shaping a spectrum of the transmission signal, and furthermore, the band selection characteristic of the equalizer is controlled to improve the SNR.

Firstly, even in a fallback mode, in the transmitting circuit 1 of FIG. 1, the sampling frequency of the discrete signal processing at the base point is not changed. Also in the receiving circuit 3, the sample rate of the discrete signal processing at the base point is not changed. A delay operator D fixes a sampling cycle corresponding to the sampling frequency 22.5 MHz at the base point.

FIG. 5 is a block diagram conceptually showing the data transmission system shown in FIG. 1 in a fallback mode.

Figure 5A:
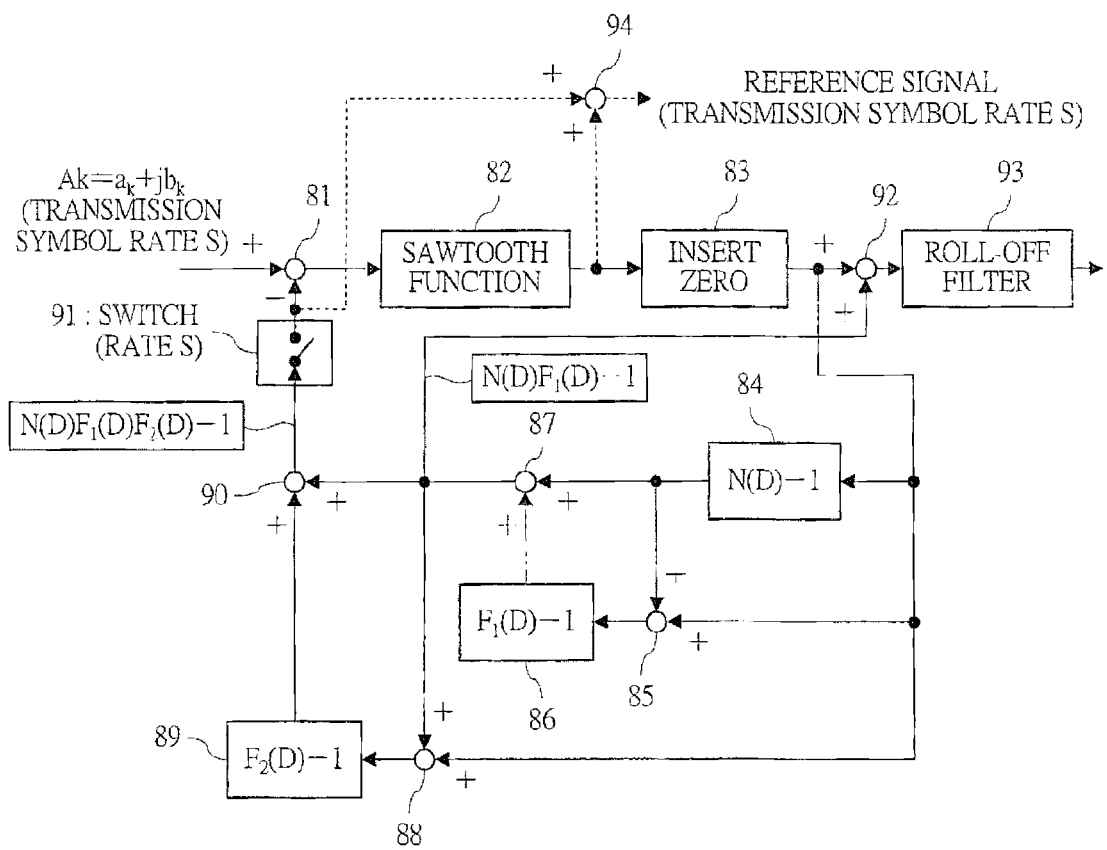
FIG. 5 is a block diagram conceptually showing the data transmission system shown in FIG. 1 in a fallback mode.
Figure 5B:
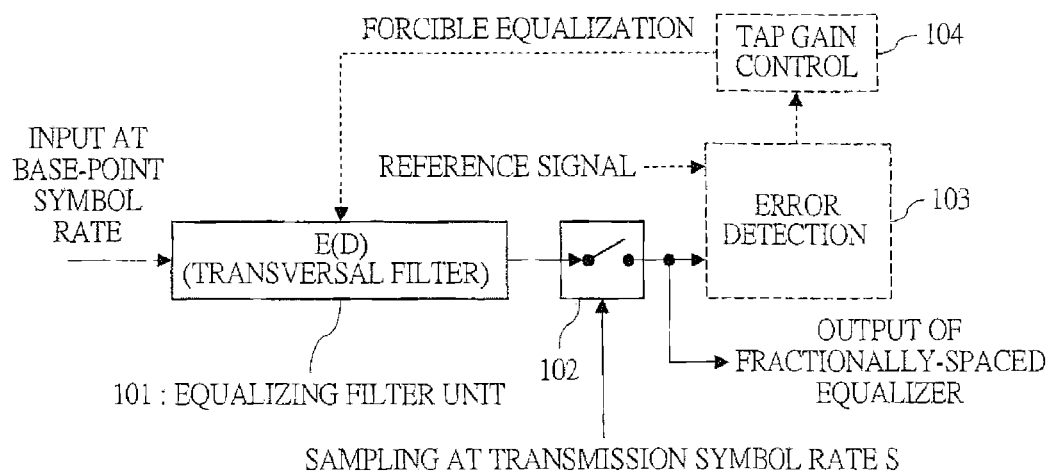

FIG. 5A is an explanatory drawing for a precoder/correlator 13 side of FIG. 1, and FIG. 5B is an explanatory drawing for an equalizer 38 side of FIG. 1.

In FIG. 5A, 81 denotes an adder of the precoder and 82 denotes a sawtooth-function output unit of the precoder. A feedback filter of the precoder corresponds to a circuit block from an output end of a zero inserting unit 83 to a switch 91 including a filter 84 with a transmission function (N(D)−1), an adder 85, a filter 86 with a transmission function (F₁(D)−1), an adder 87, an adder 88, a filter 89 with a transmission function (F₂(D)−1), and an adder 90, and a transmission function thereof is $N(D)F_1(D)F_2(D)-1$.

On the other hand, 92 denotes an adder of the correlator. A path from the output end of the zero inserting unit 83 to the filter 84 with the transmission function (N(D)−1), the adder 85, the filter 86 with the transmission function (F₁(D)−1), the adder 87, and an input end of an adder 92 has a transmission function $(N(D)F_1(D)-1)$.

In this specific example, the filters are shared for use between the precoder and the correlator to simplify the arithmetic processing. As long as the transmission function is the same, the circuit configuration is not restricted to that shown in the drawing.

Here, if $F_1(D)=1$ and $F_2(D)=F(D)$ are assumed, the transmission function becomes equal to the transmission function of the filter at the base point shown in FIG. 3.

The adder 81 inputs the transmission symbol data $A_k$ ($a_k$, $b_k$) at a transmission symbol rate S expressed by the following equation (3).

$$S=22.5/N \ [Msymbol/sec] N=1, 2, 3, \qquad (3).$$

More specifically, the transmission symbol data $A_k$ is supplied to the adder 81 once in N times of a base-point symbol timing (base-point sampling time). On the other hand, in a base-point symbol timing that does not input the transmission symbol data, zero symbol data (0, 0) is inserted by the zero inserting unit 83.

The position of this zero inserting unit 83 will be described further below.

The switch 91 and the adder 94 are shown for describing the position where the reference signal (target for forcible equalization) of the equalizer on a reception side (equalizer 38 in FIG. 1) shown in FIG. 5B appears on a transmission side.

The switch 91 is turned ON once in N times of the base-point symbol timing to supply output symbol data of the feedback path $(N(D)F_1(D)F_2(D)-1)$ to the adder 81 on an input side, and is turned OFF in other (N−1) times. When the switch 91 is turned OFF, the zero inserting unit 83 outputs zero.

Note that, even when the switch 91 is turned OFF, each filter continues to input symbol data to perform a filter process inside.

A signal obtained by adding an output of the switch 91 and an output of the sawtooth-function output unit 82 in the adder 94 is the symbol data with a reduced transmission symbol rate S to be $N(D)F_1(D)F_2(D)A(D)$ when the switch 91 is turned ON.

Note that, when estimating the spectrum amplitude of the transmission channel during a period when no transmission data is transmitted, a flat spectrum signal is passed through the notch filter 84 with a transmission function N(D) and is then output from a roll-off filter 93. The insertion of the notch filter 84 can prevent the interference with the amateur radio band in the use frequency band.

Next, the position of the zero inserting unit 83 will be described.

In a general data transmission method, on a transmission side, zero symbol data is simply input in place of transmission symbol data in a sampling time in which no transmission symbol data is input. On a reception side, reception data is simply not output in a sampling time in which no transmission symbol data is input.

However, in the case of generalized correlation symbol transmission like the embodiment of the present invention, it is required that a precoder is used on a transmission side and sampling is performed at a sampling time corresponding to the low transmission symbol rate immediately before the sawtooth-function output unit (here is still inside of the correlator) on a reception side. Therefore, conditions for inverse circuits of the precoder and the correlator are not satisfied unless zero is inserted at a position on a transmission side corresponding to a position where sampling is performed on a reception side.

As described with reference to FIG. 3, an input position 73 of the sawtooth-function output unit 70 corresponds to an input position 71 of the sawtooth-function output unit 63. Therefore, sampling performed only once in N times of the base-point symbol timing at the input position 73 corresponds to sampling performed only once in N times of the base-point symbol timing at the input position 71.

Therefore, if zero symbol data is inserted at the input position 71, the operations of the precoder and the correlator are not disturbed.

Note that, since the sawtooth-function output unit 63 outputs zero symbol data, the same result can be obtained even when zero symbol data is inserted at an output position 72 of the sawtooth-function output unit 63. In the circuit configuration of FIG. 5, the zero inserting unit is provided at an output position of the sawtooth-function output unit 82.

When the transmission symbol rate is decreased, usually, the roll-off ratio of the roll-off filter 93 is increased to narrow the spread of the pulse. In many applications, since the number of taps can be small, a symbol rate sampling equalizer is adopted on a reception side.

More specifically, the operation is performed at tap spacing of the reduced transmission symbol timing, and an error comparison with the reference signal is made at the transmission symbol timing, thereby controlling the tap gain.

However, in the transmission path of the PLC data communication system, the large attenuation in a wide section of the use band has to be assumed as a worst case. In addition, the possibility that large noise corresponding to signal power is added has to be assumed.

Thus, even in a fallback mode where transmission is performed at the reduced transmission symbol rate, each filter in the discrete signal system is operated at fractional tap spacing (base-point symbol timing). Therefore, the characteristic of the roll-off filter that determines the use band is fixed while maintaining a wide band at the base point, and the equalizer 38 shown in FIG. 1 is used as a fractionally-spaced equalizer.

FIG. 5B is a block diagram showing a general outline of the internal configuration of the fractionally-spaced equalizer.

In a fallback mode, one-Nth (N>1) of the base-point sampling rate is a transmission symbol rate at the time of fallback.

An equalizing filter unit 101 operates at a base-point symbol timing (base-point sampling cycle, tap spacing) corresponding to the base-point symbol rate, and is forcibly equalized at a transmission symbol timing corresponding to the transmission symbol rate by using the reference signal. An output of the equalizing filter unit 101 is output by a switch 102 at a reduced transmission symbol rate.

An error detecting unit 103 detects an error between the sampling output and the reference signal and controls tap gain of the equalizing filter unit 101 by using a tap-gain controlling unit 104 so as to minimize the error, thereby achieving the forcible equalization.

An output of the switch 102 is an output of the fractionally-spaced equalizer, its level is determined by the subsequent level determining unit (39 in FIG. 1), and then supplied to the sawtooth-function output unit 40. Alternatively, an output of the switch 102 is passed through the sawtooth-function output unit and then supplied to the level determining unit.

The operation of the equalizer is to minimize an integral evaluation function. As an intuitive description, the operation can be expressed by the following equation (4) of an output after equalization and the reference signal.

$$(F_1(D)N(D)H(D)+n_0)E(D)=F_1(D)N(D)F_2(D) \quad (4)$$

Here, $n_0$ is noise power.

In the fractionally-spaced equalizer, since the spacing of the impulse response of the transmission symbol data is present, if control is made so that zero crossing occurs at every Nth timing, intersymbol interference is eliminated. Flexibility that the reception signal can be set to any value in other timings is provided.

As a result, intersymbol interference can be easily eliminated. At this time, band selection without intersymbol interference is naturally made, by which the noise is suppressed. If there is noise, a band selection characteristic that suppresses noise is naturally determined.

If the intersymbol interference is eliminated, the number of levels of the output of the equalizer is decreased, and the level determination errors are not increased.

Next, the characteristic of the fractionally-spaced equalizer will be described.

The switch 102 samples an output signal of the equalizing filter unit 101 at a transmission symbol rate lower than the base-point symbol rate. Therefore, an output of the equalizing filter unit 101 is thinned out by (N−1) samples.

As a result, the output signal spectrum thereof becomes a periodic function of 22.5/N [MHz] obtained by shifting/superposing the output signal spectrum of the equalizing filter unit 101 by 22.5/N [MHz]. Similarly, the reference signal, which is a target for equalization, is also a periodic function of 22.5/N [MHz].

Figure 6:
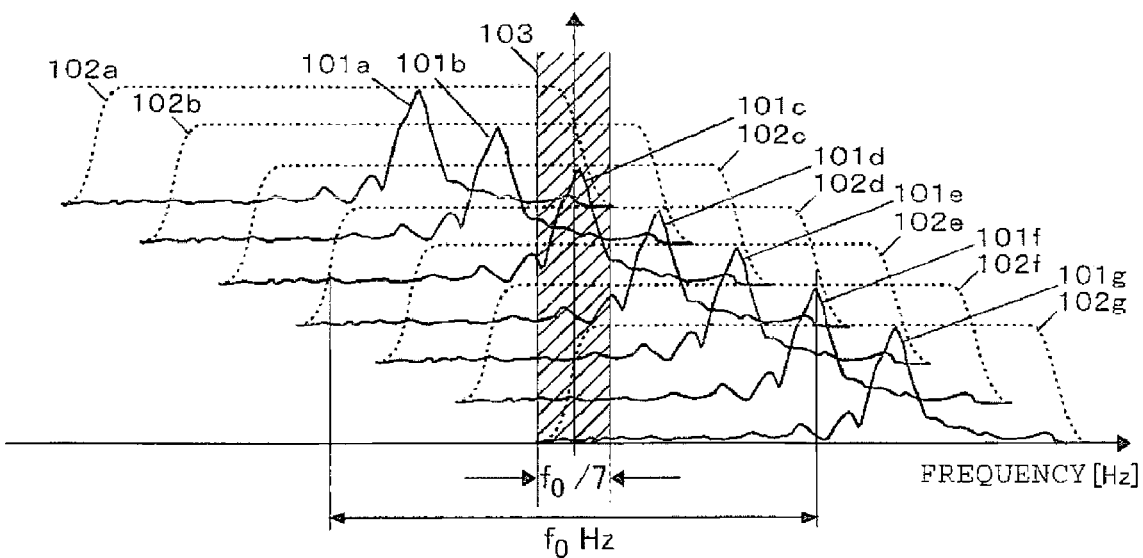
FIG. 6 is an explanatory drawing for conceptually showing the spectrum amplitudes of output signals of a fractionally-spaced equalizer.

FIG. 6 is an explanatory drawing for conceptually shoeing output signal spectrum amplitudes of the fractionally-spaced equalizer.

By way of an example, the case of fallback to N=1/7 is shown. Of the output signal spectrums of the equalizing filter unit 101 to be shifted/superposed, only seven components falling to a unit cycle ($f_0/7$) of the periodic function are shown. $f_0$ is the base-point sampling frequency of 22.5 [MHz], which is equal to the value of the base-point symbol rate.

In the drawing, 101*d* denotes an output spectrum of the equalizing filter unit 101, and 102*d* denotes a band-pass characteristic ($f_0$) of the roll-off filter 93. The output spectrum 101*d* is shifted at spacing of 22.5/N [MHz], and spectrum shift/superposition components denoted as 101*a* to 101*c* and 101*e* to 101*g* are generated.

On an output signal of the fractionally-spaced equalizer, a frequency spectrum in the pass band ($f_0$) of the roll-off filter 66 is uniformly superposed. Therefore, even if a band with a large signal output and an excellent SNR is present at any position in the pass band ($f_0$), it is included in an output of the fractionally-spaced equalizer. As a result, the fractionally-spaced equalizer naturally selects a band with an excellent SNR.

Since the equalizer tends to be closer to the reference signal, it is determined to operate so as to satisfy the equation (5) below.

By replacing the intuitive equation (4) described above by an integral evaluation function and taking the spectrum movement and superposition into consideration, the following equation (5) is obtained.

$$\sum_{i=-\infty}^{\infty} \left\{ \frac{F_1\left(f - i\frac{f_0}{N}\right)}{H\left(f - i\frac{f_0}{N}\right) + n_0} \right\} E\left(f - i\frac{f_0}{N}\right) = \sum_{i=-\infty}^{\infty} F_1\left(f - i\frac{f_0}{N}\right) F_2\left(f - i\frac{f_0}{N}\right) \quad (5)$$

There are an infinite number of solutions to this equation. When noise $n_0$ is large, the equalizer is determined to operate so as to minimize a noise amplitude within this range of flexibility.

The characteristics of the filter 86 ($F_1(D)-1$) and the filter 89 ($F_2(D)-1$) influence the performance of the apparatus. Although these filters can be configured by FIR (Finite Impulse Response) filters, since various factors are involved, determination of the characteristics is not an easy task.

Note that the calculation for obtaining the coefficient of each filter is executed on a reception side, and a solution is sent to a transmission side by the low-rate channel and then set therein.

First, an example of setting of $F_1(D)$ will be described.

$F_1(D)$ is used to shape a spectrum amplitude of the transmission signal in accordance with a decrease (1/N) in the rate of a transmission symbol input to the precoder, thereby increasing a transmission channel passage rate of spectrum energy of the transmission signal. In other words, by concentrating the transmission spectrum on a band that easily passes the transmission signal, transmission power is transmitted most efficiently, and thus the SNR can be improved.

However, this is the discussion in the case where the transmission waveform is an isolated pulse. In practice, an impulse response of each symbol is added to a transmission waveform when data signals are successively transmitted.

$$|F_1(D)|=|H(D)|^a \quad (6)$$

By increasing a in the equation (6), the transmission rate of the signal is increased, but the impulse response of an FIR filter achieving $F_1(D)$ is significantly increased. As a result, due to the intersymbol interference, the number of levels that the transmission signal can take, in other words, the number of levels that the reference signal can take is increased. Since transmission power is constant, the mutual level difference is decreased. Consequently, in the level determination of the equalization output, the error rate is abruptly increased.

Therefore, $F_1(D)$ is set to be adjustable in an associated manner in consideration of the performance (for example, error rate) of digital transmission.

When N=1 (base point), an excellent SNR can be achieved at a reception end, and therefore, there is no need to shape the transmission spectrum. Therefore, a=0 and $F_1(D)=1$ are set.

When noise power is large with respect to a signal power and communication at the transmission rate is impossible, the transmission symbol rate is decreased through the fallback control.

As N is increased, an approximation is made to $|F_1(D)|=|H(D)|$. Even if the transmission spectrum amplitude is emphasized, as described above, the fractionally-spaced equalizer has sufficient equalization capability, and level determination error is not increased.

Also, the impulse response of the FIR filter achieving $F_1(D)$ is desired to be quickly attenuated. To this end, in the equation (7), a coefficient $a_i$ is preferably decreased as i becomes a higher order.

$$F_1(D) = \sum_{i=0}^{M-1} a_i D^i \qquad (7)$$

Since the requirement for $F_1(D)$ is contradictory, the following evaluation function is introduced to obtain $F_1(D)$ that minimizes $J_1$.

$$J_1 = á\int \{|H(D)|^{P(N)} - |F_1(D)|\}^2 df + â\sum_{i=0}^{M-1} i^2|a_i| \to \min \qquad (8)$$

Here, $P(N)$ is a monotone increasing function of $N$ and is expressed by the following equation (9).

$$P(N) = \sqrt{(N-1)/N\max} \quad N=1,2\ldots,N\max \qquad (9)$$

The second term on the right side represents a secondary moment of the response of the FIR filter, and a weight $i^2$ is increased for a higher-order coefficient $a_i$.

Therefore, as N is increased, the first term on the right side is associated with an increase of the channel passage rate, and the second term on the right side is associated with a decrease of the number of transmission levels and an improvement of the level determination error rate on a reception side.

Next, $F_2(D)$ will be described.

Since $F_2(D)$ is a transmission function included in the precoder, the spectrum of the transmission signal itself is not shaped. However, because of the premise of the generalized correlation symbol transmission, the precoder is taken as an inverse circuit with respect to a path including the subsequent equalizer. Therefore, the characteristic of the equalizer is changed by $F_2(D)$.

In the above-mentioned equation (4) in the base-point transmission symbol rate, when $n_0=0$, the equation (10) is obtained.

$$H(D)E(D) = F_2(D) \qquad (10)$$

Here, when the equation (11) is applied, if b is increased to be equal to or more than 1, the spectrum amplitude $|E(D)|$ of the equalizer $E(D)$ selects a band with a large signal level for output, and thus, the SNR is improved.

$$|F_2(D)| = |H(D)|^b \qquad (11)$$

However, the FIR impulse response is extremely increased, the number of levels becomes infinite, and the level determination error rate is rapidly deteriorated.

For this reason, $F_2(D)$ is also determined in consideration of the performance (error rate) of digital transmission.

As described with reference to FIG. 3, a basic equalization characteristic (equalization characteristic at the base-point symbol rate) $E(D)$ of the equalizer 69 is a phase equalizer, its spectrum amplitude is flat, and $|F(D)|$ is taken as $|H(D)|$. In FIG. 5A, since $F_2(D)$ corresponds to $F(D)$, $|F_2(D)| = |H(D)|$ is satisfied.

As described above, in the fractionally-spaced equalizer, the equalization capability becomes more sufficient as N is increased. Therefore, a band is naturally selected and the capability of suppressing noise is improved.

Therefore, as N is increased, the operation of the fractionally-spaced equalizer itself is more entrusted, and $F_2(D)=1$ is set at $N\max$. The precoder is an inverse circuit of only $F_1(D)$ $N(D)$ for shaping the transmission spectrum.

The setting to $F_2(D)=1$ leads to a decrease in the number of levels of the transmission signal and the number of levels of the reference signal, and therefore, a level determination error rate on a reception side can be improved.

Furthermore, the impulse response of the FIR filter achieving $F_2(D)$ is also desired to be quickly attenuated. To this end, in the equation (12), a coefficient $b_i$ is preferably decreased as i becomes a higher order.

$$F_2(D) = \sum_{i=0}^{M-1} b_i D^i \qquad (12)$$

Since the requirement for $F_2(D)$ is contradictory, the following evaluation function is introduced to obtain $F_2(D)$ that minimizes $J_2$.

$$J_2 = á\int \{|H(D)|^{Q(N)} - |F_2(D)|\}^2 df + â\sum_{i=0}^{M-1} i^2|b_i| \to \min \qquad (13)$$

Here, $Q(N)$ is a monotone increasing function of $N$ and is expressed by the following equation (14).

$$Q(N) = 1 - \sqrt{(N-1)/N\max} \quad N=1,2\ldots,N\max \qquad (14)$$

The second term on the right side is similar to the second term on the right side of the evaluation function $J_1$.

Therefore, as N is increased, the first term on the right side improves the signal band selection capability and the noise suppression capability of the equalizer, and the second term on the right side decreases the number of transmission levels to improve the level determination error rate on a reception side.

In the above-described specific embodiment, $|F_1(D)|$ and $|F_2(D)|$ are expressed by a power of $|H(D)|$, but it is merely an example. The bottom line is that an $F_1(D)$ function group for shaping the transmission spectrum to increase a passage rate and an $F_2(D)$ function group for decreasing the selection characteristic of the reception signal are prepared.

Note that the correlation characteristic of the reference signal is approximated as in the following equation (15), in which $N(D)$ is neglected.

$$|F_1(D)| \cdot |F_2(D)| \approx |H(D)|^{P(N)}|H(D)|^{Q(N)} = |H(D)|^{P(N)+Q(N)} \qquad (15)$$

Therefore, when the power "$P(N)+Q(N)$" is large, the number of levels is increased and the mutual level difference in the reception levels is decreased, and it is disadvantageous for the error-rate characteristic.

FIG. 7 is first and second graphs showing an example of simulation results according to an embodiment of the present invention. 4-phase QAM is taken as the base point (bit rate of 45 Mbps), and 22.5 [Msymbol/sec] is taken as the base-point symbol rate. In this case, the equations (16) and (17) are applied and N=10 and Nmax=16 are set. Also, a notch filter is implemented.

$$|F_1(D)| = |H(D)|^{P(n)} = |H(D)|^{\sqrt{(N-1)/N\max}} \qquad (16)$$

$$|F_2(D)| = |H(D)|^{Q(n)} = |H(D)|^{1-\sqrt{(N-1)/N\max}} \qquad (17)$$

Figure 7A:
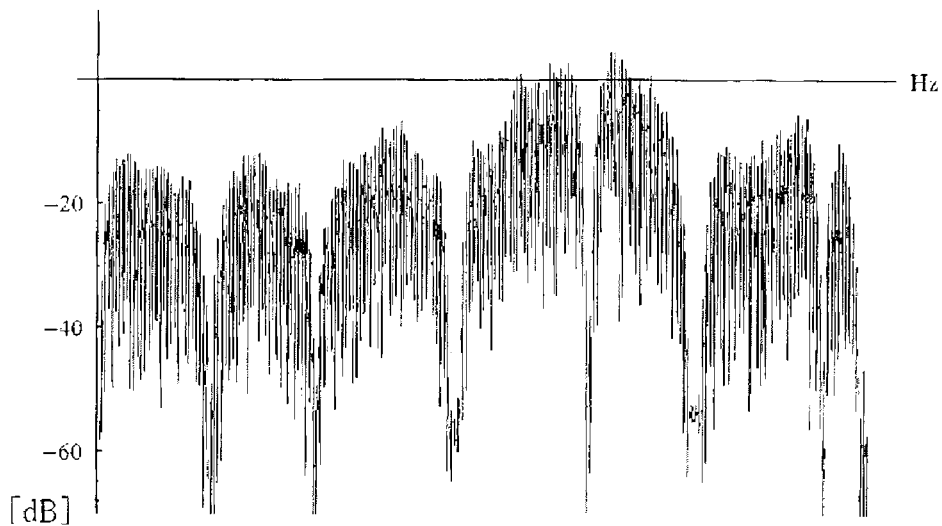
FIG. 7 is first and second graphs showing an example of simulation results according to an embodiment of the present invention.

FIG. 7A shows a power spectrum of a transmission signal, in which an amateur radio band is notched.

Figure 7B:
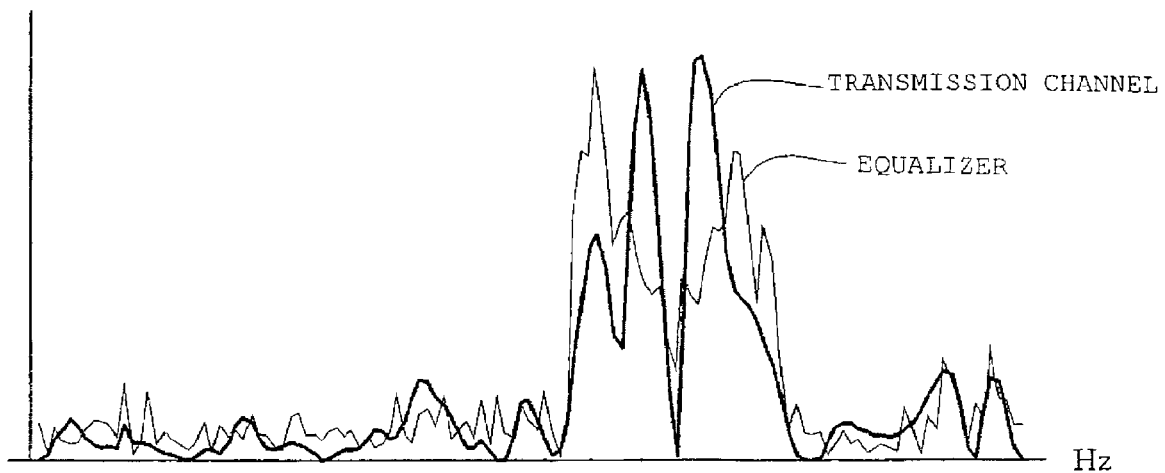

FIG. 7B shows a spectrum amplitude characteristic of a transmission channel and a spectrum amplitude ($|E(D)|$) characteristic of the equalizer ($E(D)$). The horizontal axis represents frequency, and the vertical axis represents amplitude (linear). A notch of an amateur radio band is included.

Figure 8:
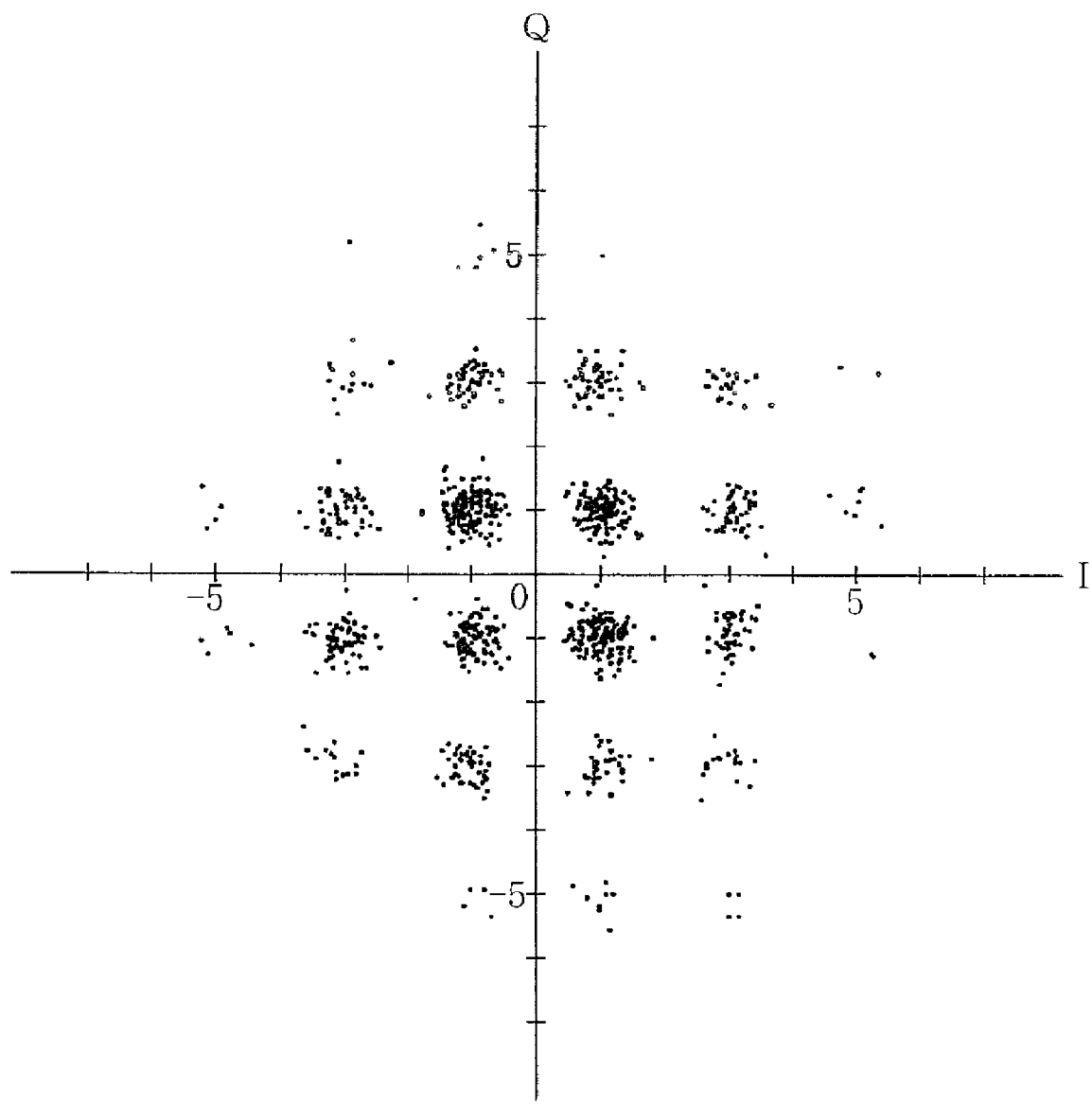
FIG. 8 is a third graph showing an example of simulation results according to an embodiment of the present invention.

FIG. 8 is a third graph showing an example of simulation results according to an embodiment of the present invention, and is an eye diagram of the equalization results. In other words, the equalizer (fractionally-spaced equalizer) outputs are shown by the arrangement of symbol points on a phase plane.

The horizontal axis represents an I-phase data, and the vertical axis represents a Q-phase data. P in a sawtooth function satisfies P=2.

In the drawing, the centers of distribution of the dispersed symbol points are points corresponding to the odd multiple levels of each I-phase data and Q-phase data of transmission symbol points (1, 1), (1, −1), (−1, −1), and (−1, 1). Because of the generalized correlation symbol transmission, the number of levels of the symbol points is increased (for each I-phase data and Q-phase data), and symbol arrangement is dispersed due to noise. The reference signal takes a symbol arrangement with no noise.

In FIG. 1, in the level determining unit 39, for example, level determination is performed by providing a threshold between the levels to be determined, thereby reducing an influence of noise.

As a result of the consideration including the simulation results whose illustrations are omitted, as N is increased, effects of transmission spectrum shaping and the fractionally-spaced equalizer abruptly occur at some time point. This phenomenon depends on the channel characteristic.

Therefore, at a stage of a modulation scheme that does not take 2-phase PAM as a base point but takes a larger number of modulation multi-values than that of 2-phase PAM, for example, in the fallback control that takes the 4QAM (45 Mbps) as a base point, better results are obtained even with the same transmission data rate (bit rate). Also, if a slight error correction is performed, 16QAM (90 Mbps) can be taken as a base point.

Therefore, the fallback control may be performed by selecting an optimum combination from a plurality of possible combinations of the number of modulation multi-values and transmission symbol rate in advance through simulations and others.

Finally, the initialization protocol will be additionally described.

In the initialization protocol, since the equalizer 38 shown in FIG. 1 is operated as a fractionally-spaced equalizer when fallback is performed, timing match with an accuracy of the base-point transmission symbol spacing (base-point sampling cycle) is not required for the sampling phase control of the ND converter 32 and the synchronization control between the reference signal and the equalizer 38.

Therefore, when forcible equalization of the equalizer 38 does not converge, that directly means that "communication is impossible at this communication rate". As a result, the determination as to whether to decrease the communication rate can be made by a convergence check about forcible equalization, which is easily done in a short time (about 2000 symbols in terms of 22.5 [Msymbol/sec]). This contributes to the simplification of the initialization protocol.

In the above description, spectrum shaping is performed so that the transmission signal has a notch characteristic, and this is for the specifications of the PLC data communication system. Therefore, it is unnecessary if a channel not depending on such specifications is used. Also, if there are any different restrictions on a band, the spectrum of the transmission signal can be shaped in accordance with such restrictions.

In the above description, spectrum shaping with $F_1(D)$ and band selection control of the equalizer with $F_2(D)$ are both performed. Alternatively, only one of them may be implemented.

In the above description, it is preconditioned that a transmission power is constant, and this means that average power of transmission signals including power spectra in all frequencies is restricted to be constant. Under this condition, since the transmission power spectra are concentrated on a band through which the transmission signal can easily pass (called water filling theorem), $F_1(D)$ is set with the equations (8) and (9).

In the PLC data communication system, it has been studied that a peak restriction is provided on spectrum energy of the transmission signal, in other words, a power spectrum of each frequency in consideration of interference with another communication system.

A peak restriction characteristic with respect to a transmission power spectrum is hereinafter expressed by a transmission function $P(D)$. $P(D)$ represents only a real part, and the phase is zero for all frequency components. Typically, aside from the notch characteristic $N(D)$, $P(D)=1$ is set uniformly for the frequencies.

When the transmission power spectrum has a peak restriction, the above-described concentration of transmission power spectra on a band through which the transmission signal can easily pass cannot be achieved. This is because, if transmission power spectra are concentrated on a band through which the transmission signal can easily pass, a power spectrum in this band is increased to exceed a restriction value.

Therefore, in the case where a peak restriction is provided to the transmission power spectrum as transmission standards based on laws and regulations, in FIG. 5A describing the precoder/correlator 13 shown in FIG. 1, optimum settings have to be considered again for the transmission functions $F_1(D)$ and $F_2(D)$.

The transmission function $F_1(D)$ is now studied.

First, the case of an analog transmission signal will be considered. It is assumed that the analog transmission signal is received after white Gaussian noise is added thereto under the influence of an attenuation characteristic of the transmission channel. Here, "optimum" means that the reception signal contains a largest amount of information about the transmission signal. Also, a variable to be obtained is a transmission power spectrum. If the transmission power spectrum of the analog transmission signal has a peak restriction, a transmission power spectrum equal to a peak restriction value is optimum.

Strictly speaking, the above optimization is extremely complicated for a digital transmission signal, and cannot be applied as it is. However, this can be almost optimum.

Here, when a fixed notch filter is inserted, the transmission power spectrum is expressed by a transmission function $N(D)$ $F_1(D)$ (corresponding to an output of the adder 57 in FIG. 2).

Therefore, when the peak restriction characteristic $P(D)$ is provided to the transmission power spectrum, it is "optimum" to transmit a transmission signal having a spectrum amplitude equal to the peak restriction characteristic $N(D)P(D)$ in the case of inserting a fixed notch filter.

Involvement of the peak restriction characteristic $P(D)$ will be described by using the specific example thereof.

In the case of a piecewise peak restriction, it is optimum to approximate its peak restriction characteristic $P(D)$ with an FIR filter $F_1(D)$.

This approximation is obtained by minimizing the following equation (18).

$$J_1 = á\int \{P(D) - |F_1(D)|\}^2 df + â\sum_{i=0}^{M-1} i^2|a_i| \to \min \quad (18)$$

The first term on the right side is associated with approximation of the spectrum amplitude $|N(D)||F_1(D)|$ of the transmission signal to the peak restriction characteristic $|N(D)|P(D)$ of the transmission power spectrum.

In this case, $|N(D)|$ is deleted to cause $|F_1(D)|$ to be closer to $P(D)$. The difference between the case of taking $|N(D)|$ into consideration and the case of not taking $|N(D)|$ into consideration matters restrictively to a band where a spectrum amplitude of the transmission function $N(D)$ is small. Therefore, the value of $F_1(D)$ is almost the same.

The second term on the right side is associated with a decrease of the number of transmission levels and an improvement of the level determination error rate on a reception side. Like the equation (8), it represents a secondary moment of the response of the FIR filter, and a weight $i^2$ is increased for a higher-order coefficient $a_i$.

Note that, when the peak restriction characteristic with respect to the transmission power spectrum is a uniform peak restriction ($P(D)=1$), it is optimum to set a transmission signal of a flat spectrum with $F_1(D)=1$.

In any cases including the case of the base point for fallback ($N=1$), $F_1(D)$ is set as a fixed value irrespectively of the transmission symbol rate (one-Nth of the base-point symbol rate).

FIG. 9 is fourth and fifth graphs showing an example of simulation results according to an embodiment of the present invention. The horizontal axis represents frequency [Hz], and the vertical axis represents amplitude [dB].

Figure 9A:
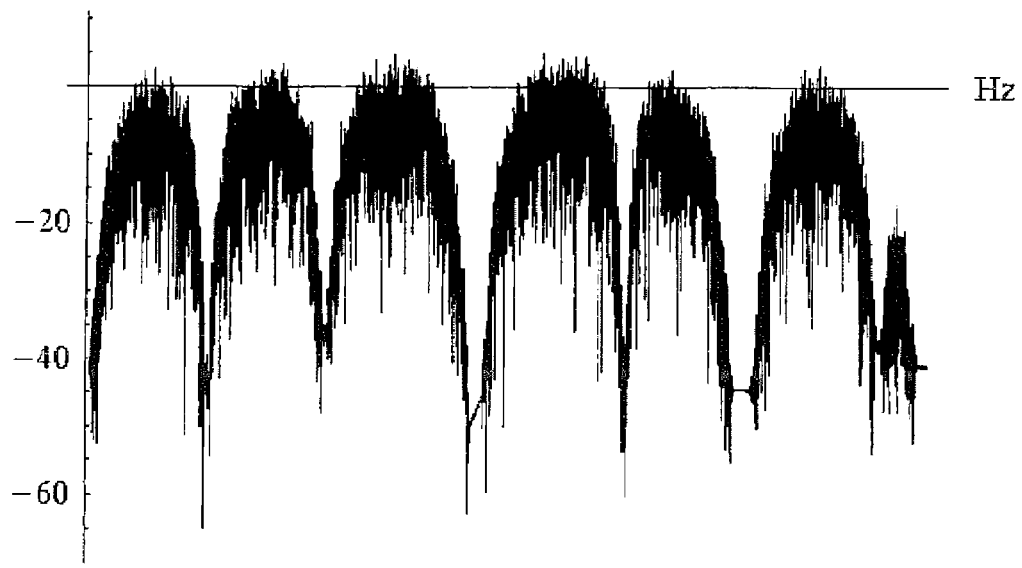
FIG. 9 is fourth and fifth graphs showing an example of simulation results according to an embodiment of the present invention.
Figure 9B:
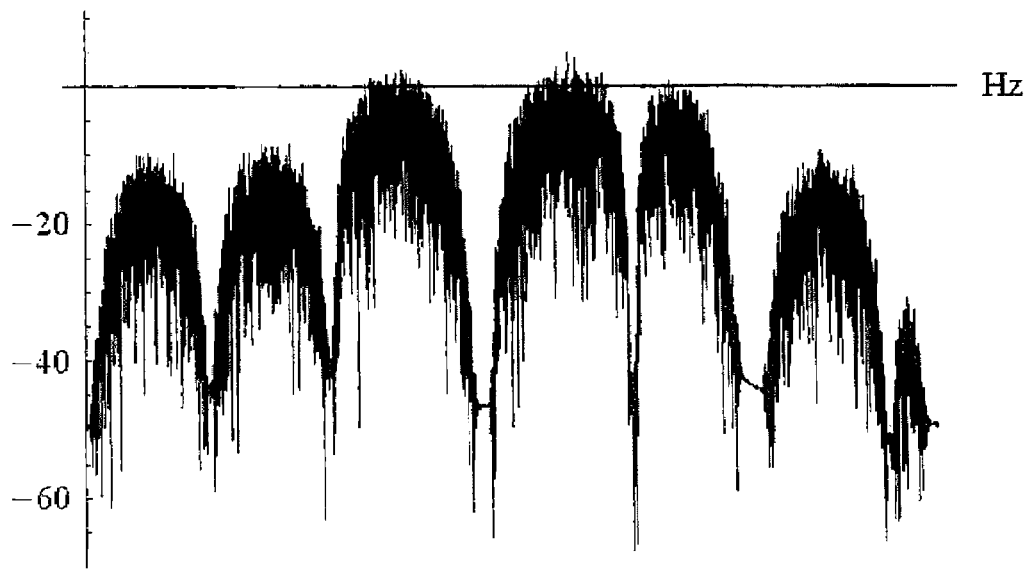

FIG. 9A is a graph showing a transmission power spectrum in the case of a uniform peak restriction. At this time, $F_1(D)=1$. FIG. 9B is a graph showing a transmission power spectrum in the case of a piecewise peak restriction.

Similar to FIG. 7 described above, 4-phase QAM (bit rate of 45 Mbps) is taken as the base point, 22.5 [Msymbol/sec] is taken as the base-point symbol rate, and N=10 is set. In order to decrease the transmission power spectrum of the amateur radio band, a fixed notch filter is implemented.

FIG. 10 is sixth, seventh, and eighth graphs showing an example of simulation results according to an embodiment of the present invention.

Figure 10A:
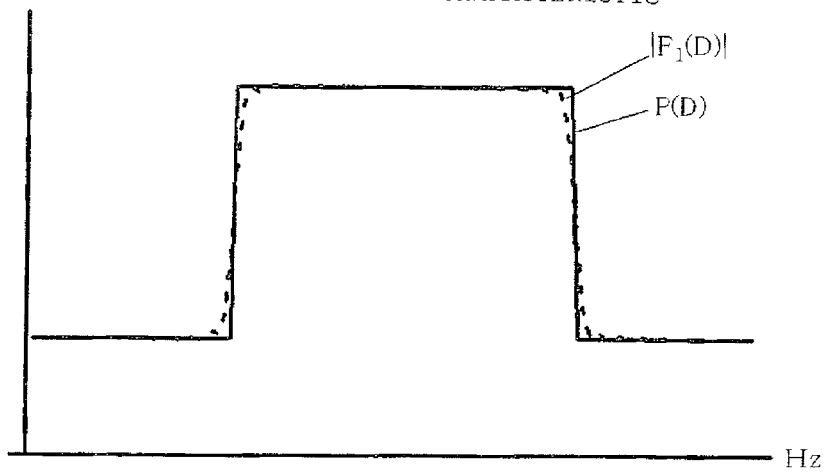
FIG. 10 is sixth, seventh, and eighth graphs showing an example of simulation results according to an embodiment of the present invention.

FIG. 10A is a graph showing a peak restriction characteristic $P(D)$ of a transmission power spectrum and a spectrum amplitude $|F_1(D)|$ of the transmission function $F_1(D)$, which are preconditions for obtaining the transmission power spectrum shown in FIG. 9B.

The horizontal axis represents frequency [Hz], and the vertical axis represents spectrum amplitude (linear). In this graph, a solid line represents the peak restriction characteristic $P(D)$, and a dotted line represents the spectrum amplitude $|F_1(D)|$ approximated to the peak restriction characteristic $P(D)$ by the equation (18). The number of taps of a filter achieving the transmission function $F_1(D)$ is assumed to be 32.

Figure 10B:
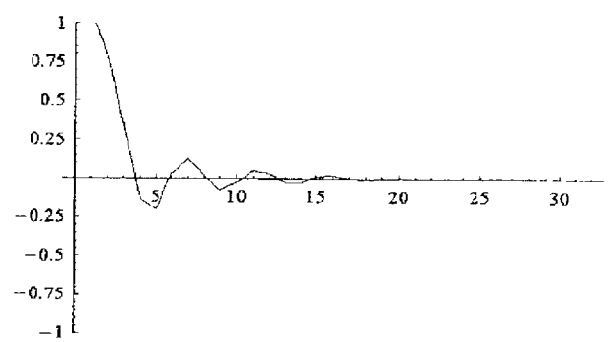
Figure 10C:
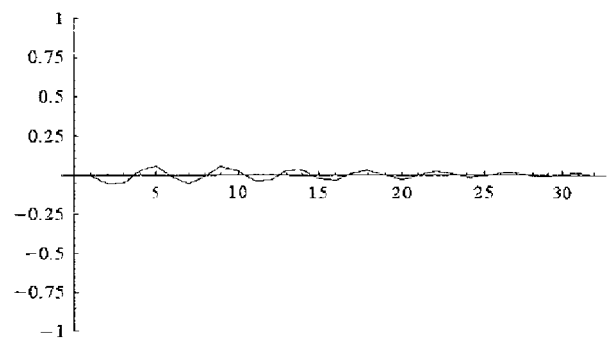

FIG. 10B is a graph showing a real part of an impulse response of the transmission function $F_1(D)$, and FIG. 10C is a graph showing an imaginary part of the impulse response of the transmission function $F_1(D)$. The horizontal axis represents the time expressed by the number of base-point symbols by taking 1 as an inverse number of the base-point symbol rate (sampling frequency).

Next, the transmission function $F_2(D)$ is studied.

Under the above-described preconditions that make the transmission power constant (average power of transmission signals including power spectra in all frequencies is restricted to be constant), the transmission function $F_2(D)$ is set so that the signal-to-noise ratio is improved by controlling the band selection characteristic of the equalizer.

Specifically, the setting in accordance with the transmission symbol rate (one-Nth of the base-point symbol rate) is made by using the equation (13). Since this transmission function $F_2(D)$ does not change the transmission power spectrum, the equation (8) can be used even when a peak restriction is provided.

However, in the case of a uniform peak restriction $P(D)=1$, the transmission function $F_1(D)=1$. Therefore, in the above-described equation (15) for a correlation characteristic of the reference signal, also at the time of the fallback (N is 2 or more), even when the transmission function $F_2(D)$ is set to have the same value as the value at the time of the base point (N=1) for the fallback, the number of levels is not increased so much.

In addition, even when a piecewise peak restriction characteristic $P(D)$ is provided, since the transmission function $F_1(D)$ is close to 1 unless this restriction has a complicated characteristic, the transmission function $F_2(D)$ can be set to have the same value as the value at the time of the base point (N=1) for the fallback in the same manner.

In this case, when the transmission function of the transmission channel is set to $H(D)$, the transmission function $F_2(D)$ is set so that a spectrum amplitude $|N(D)H(D)|$ of $N(D)H(D)$ is close to $|N(D)||F_2(D)|$. This approximation is obtained by, for example, minimizing equation (19) below.

According to the current specifications of the PLC data communication system, a fixed notch characteristic is provided so as not to have a spectrum component in an amateur radio band.

$$J_2 = á\int \{|R(D)| - |N(D)| \cdot |F_2(D)|\}^2 df + â\sum_{i=0}^{M-1} i^2|b_i| \to \min \quad (19)$$

$$|R(D)| = |N(D)H(D)| \quad (20)$$

Here, $|R(D)|$ represents a spectrum of the reception signal when a periodic test signal having a correctly flat spectrum is transmitted through a fixed notch filter $N(D)$. Since $N(D)$ is already known, $F_2(D)$ can be optimized with the equation (19).

The first term on the right side is associated with setting $|F_2(D)|$ by which the following equation (21) obtained by substituting $F_1(D)=1$ and $n_0=0$ into the above-described equation (4) for the output after equalization and the reference signal is established with respect to the spectrum amplitude.

$$N(D)H(D)E(D) = N(D)F_2(D) \quad (21)$$

Here, since the transmission function $E(D)$ of the equalizer 69 shown in FIG. 3 functions as a phase equalizer with a flat amplitude characteristic, it is assumed that $|E(D)|=1$.

The second term on the right side is associated with a decrease of the number of transmission levels and an improvement of the level determination error rate on a reception side. Similar to the equation (13), it represents a secondary moment of the response of the FIR filter, and the weight $i^2$ is increased for a higher-order coefficient $b_i$.

The above-described equation (19) is set irrespectively of the transmission symbol rate (one-Nth of the base-point symbol rate), including the case of the base point for fallback (N=1).

Note that the evaluation function $J_2$ of the above-described equation (13) is created based on the equation (21) in which N(D) on both right and left sides are deleted.

However, it is R(D)=N(D)H(D) that is actually measured on a reception side. Therefore, since the evaluation function $J_2$ of the equation (19) does not require a procedure of obtaining H(D) from R(D)=N(D)H(D), the number of numerical processes is smaller in the evaluation function $J_2$ of the equation (19) compared with an evaluation function $J_2$ similar to the equation (13) where the first term on the right side of the equation (19) is replaced by an integral of $\{|H(D)|-|F_2(D)|\}^2$.

Although the obtained value $|F_2(D)|$ is slightly different between these two evaluation functions, the difference between the case of taking |N(D)| into consideration and the case of not taking |N(D)| into consideration matters restrictively to a band where a spectrum amplitude of the transmission function N(D) is small. For this reason, the value of $|F_2(D)|$, that is, the value $N(D)F_2(D)$ of the reference signal is almost the same.

Even in the equation (13) described above, an evaluation function including N(D) can be provided. In this case, |H(D)| of the equation (13) is replaced by |N(D)H(D)| and $|F_2(D)|$ thereof is replaced by $|N(D)||F_2(D)|$.

FIG. 11 is ninth, tenth, and eleventh graphs showing an example of simulation results according to an embodiment of the present invention.

Figure 11A:
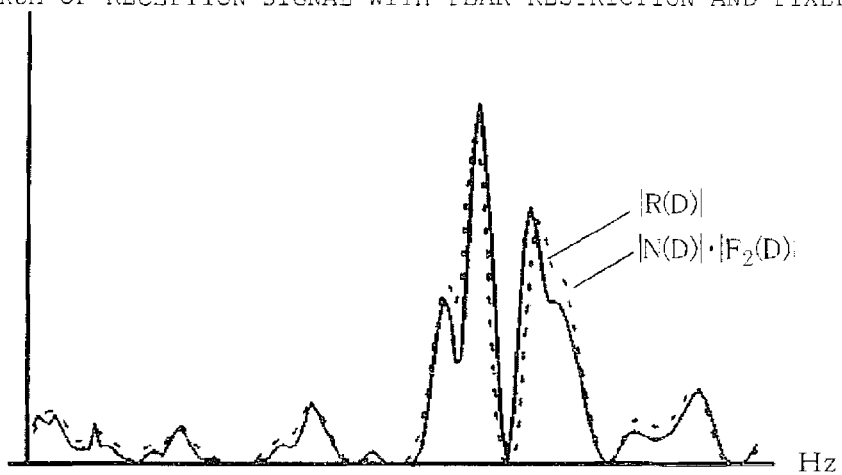
FIG. 11 is ninth, tenth, and eleventh graphs showing an example of simulation results according to an embodiment of the present invention.

FIG. 11A is a graph of a specific example of spectrum amplitudes |R(D)| and $|N(D)|\cdot|F_2(D)|$ of the reception signal. A solid line represents a spectrum amplitude |R(D)| of a reception signal, and a dotted line represents an amplitude characteristic $|N(D)|\cdot|F_2(D)|$ approximated in accordance with the equation (19). The number of taps of a filter achieving the transmission function $F_2(D)$ is assumed to be 32.

Figure 11B:
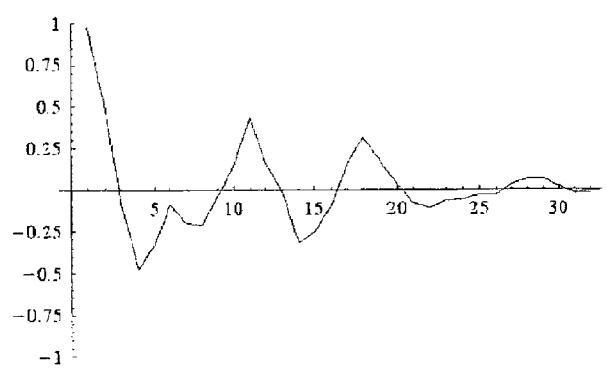
Figure 11C:
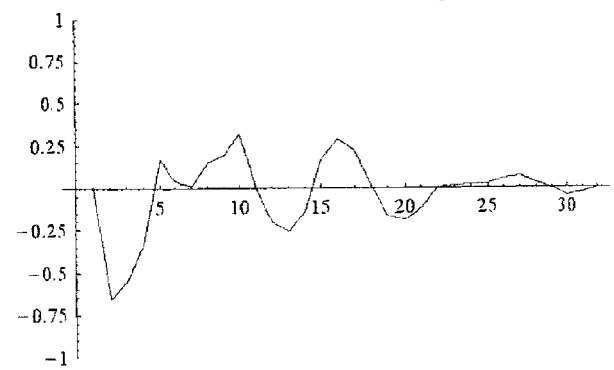

FIG. 11B is a graph showing a real part of an impulse response of the transmission function $F_2(D)$, and FIG. 11C is a graph showing an imaginary part of the impulse response of the transmission function $F_2(D)$. The horizontal axis represents time expressed by the number of base-point symbols by taking 1 as an inverse number of the base-point symbol rate (sampling frequency).

The settings of the transmission functions $F_1(D)$ and $F_2(D)$ when a peak restriction is provided to the transmission power spectrum have been described using the case where a fixed notch filter is provided as an example. However, a notch characteristic is not required in some cases depending on transmission standards. In such cases, in the above-described equations (18), (19) and (20), $F_1(D)$ and $F_2(D)$ can be set with N(D)=1.

At this time, if a fixed notch filter is removed in the case of the uniform peak restriction P(D)=1, the transmission functions of the filters 84 and 86 become 0 in FIG. 5A, and these filters 84 and 86 become unnecessary. As a result, the configuration of the correlator on a transmission apparatus side is not required.

The description above is made on the premise of the generalized correlation symbol transmission scheme. However, even in the general data transmission where transmission is made at a transmission symbol rate reduced from the base-point symbol rate by using a wide band corresponding to the base-point symbol rate and level determination is performed on a reception side by using a fractionally-spaced equalizer, the fractionally-spaced equalizer can be naturally provided with a band selection characteristic. At this time, spectrum shaping and control over the band selection characteristic of the equalizer can be performed without using the generalized correlation symbol transmission scheme.

Also, the application of the data transmitting method according to the present invention is not restricted to a PLC data communication system. For example, it can be applied to a data transmitting method using a metallic subscriber line and a subscriber-system wireless access line in a public telephone communication network.

The data transmitting method according to the present invention can bring significant effects when it is applied to a low-quality transmission path, in which a transmission channel is attenuated over a wide band and a noise level is high.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A data transmitting apparatus used for a data transmitting method including the steps of:
    inputting a transmission symbol data at a transmission symbol rate which is one-Nth (N is an integer of 2 or more) of a base-point symbol rate to create a transmission symbol waveform at the base-point symbol rate by a precoder and a correlator;
    transmitting the transmission symbol waveform through a roll-off filter having a band corresponding to the base-point symbol rate;
    inputting a reception signal to a fractionally-spaced equalizer that operates at the base-point symbol rate and is forcibly equalized at the transmission symbol rate by using a reference signal;
    determining a level of a signal output from the fractionally-spaced equalizer at the transmission symbol rate; and
    obtaining a sawtooth function output of a level-determined symbol data, thereby outputting a reception symbol data;
    wherein the precoder has a sawtooth-function output unit;
    wherein once in N times of a base-point symbol timing corresponding to the base-point symbol rate, another transmission symbol data is input to the sawtooth-function output unit, the another transmission symbol data is obtained by subtracting from the input transmission symbol data an output of the sawtooth-function output unit that is passed through a filter with a transmission function $F_1(D)-1$;
    and an output of the sawtooth-function output unit is taken as an output symbol data of the precoder, wherein, in a base-point symbol timing that does not input the transmission symbol data, zero symbol data is output to the filter with the transmission function $F_1(D)-1$ and zero symbol data is taken as the output symbol data of the precoder;
    the correlator adds the output symbol data of the precoder and a symbol data obtained by passing the output symbol data though a filter with the transmission function $F_1(D)-1$ to take the addition result as an output symbol data of the correlator,
    thereby creating the transmission symbol waveform, and the transmission function $F_1(D)$ is set so that a channel passage rate of a spectrum energy of a transmission signal is increased.

2. The data transmitting apparatus according to claim 1, wherein a notch characteristic is provided to the spectrum energy of the transmission signal by taking N(D) as a transmission function of a notch filter and replacing the transmission function $F_1(D)$ of the precoder and the correlator by a transmission function $N(D)F_1(D)$.

3. A data transmitting apparatus used for a data transmitting method including the steps of:
  inputting a transmission symbol data at a transmission symbol rate which is one-Nth (N is an integer of 2 or more) of a base-point symbol rate to create a transmission symbol waveform at the base-point symbol rate by a precoder;
  transmitting the transmission symbol waveform through a roll-off filter having a band corresponding to the base-point symbol rate;
  inputting a reception signal to a fractionally-spaced equalizer that operates at the base-point symbol rate and is forcibly equalized at the transmission symbol rate by using a reference signal;
  determining a level of a signal output from the fractionally-spaced equalizer at the transmission symbol rate; and
  obtaining a sawtooth function output of a level-determined symbol data, thereby outputting a reception symbol data;
  wherein the precoder has a sawtooth-function output unit;
  wherein once in N times of a base-point symbol timing corresponding to the base-point symbol rate, another transmission symbol data is input to the sawtooth-function output unit, the another transmission symbol data is obtained by subtracting from the input transmission symbol data an output of the sawtooth-function output unit that is passed through a filter with a transmission function $F_2(D)-1$;
  an output of the sawtooth-function output unit is taken as an output symbol data of the precoder, wherein, in a base-point symbol timing that does not input the transmission symbol data, zero symbol data is output to the filter with the transmission function $F_2(D)-1$ and zero symbol data is taken as the output symbol data of the precoder;
  thereby creating the transmission symbol waveform, and
  the transmission function $F_2(D)$ is set so that a signal-to-noise ratio is improved by controlling a band selection characteristic of the fractionally-spaced equalizer.

4. A data transmitting apparatus used for a data transmitting method including the steps of:
  inputting a transmission symbol data at a transmission symbol rate which is one-Nth (N is an integer of 2 or more) of a base-point symbol rate to create a transmission symbol waveform at the base-point symbol rate by a precoder and a correlator;
  transmitting the transmission symbol waveform through a roll-off filter having a band corresponding to the base-point symbol rate;
  inputting a reception signal to a fractionally-spaced equalizer that operates at the base-point symbol rate and is forcibly equalized at the transmission symbol rate by using a reference signal;
  determining a level of a signal output from the fractionally-spaced equalizer at the transmission symbol rate; and
  obtaining a sawtooth function output of a level-determined symbol data, thereby outputting a reception symbol data,
  wherein the precoder has a sawtooth-function output unit;
  wherein once in N times of a base-point symbol timing corresponding to the base-point symbol rate, another transmission symbol data is input to the sawtooth-function output unit, the another transmission symbol data is obtained by subtracting from the input transmission symbol data an output of the sawtooth-function output unit that is passed through a filter with a transmission function $F_1(D)F_2(D)-1$;
  an output of the sawtooth-function output unit is taken as an output symbol data of the precoder, wherein, in a base-point symbol timing that does not input the transmission symbol data, zero symbol data is output to the filter with the transmission function $F_1(D)F_2(D)-1$ and zero symbol data is taken as the output symbol data of the precoder,
  the correlator adds the output symbol data of the precoder and one obtained by passing the output symbol data though a filter with the transmission function $F_1(D)-1$ to take the addition result as an output symbol data of the correlator,
  thereby creating the transmission symbol waveform,
  the transmission function $F_1(D)$ is set so that a channel passage rate of a spectrum energy of a transmission signal is increased, and the transmission function $F_2(D)$ is set so that a signal-to-noise ratio is improved by controlling a band selection characteristic of the fractionally-spaced equalizer.

5. The data transmitting apparatus according to claim 4, wherein a notch characteristic is provided to the spectrum energy of the transmission signal by taking N(D) as a transmission function of a notch filter and replacing the transmission function $F_1(D)$ of the precoder and the correlator by a transmission function $N(D)F_1(D)$.

6. A data transmitting apparatus used for a data transmitting method including the steps of:
  inputting a transmission symbol data at a transmission symbol rate which is one-Nth (N is an integer of 2 or more) of a base-point symbol rate to create a transmission symbol waveform at the base-point symbol rate by a precoder and a correlator;
  transmitting the transmission symbol waveform through a roll-off filter having a band corresponding to the base-point symbol rate;
  inputting a reception signal to a fractionally-spaced equalizer that operates at the base-point symbol rate and is forcibly equalized at the transmission symbol rate by using a reference signal;
  determining a level of a signal output from the fractionally-spaced equalizer at the transmission symbol rate; and
  obtaining a sawtooth function output of a level-determined symbol data, thereby outputting a reception symbol data,
  wherein the precoder has a sawtooth-function output unit;
  wherein once in N times of a base-point symbol timing corresponding to the base-point symbol rate, another transmission symbol data is input to the sawtooth-function output unit, the another transmission symbol data is obtained by subtracting from the input transmission symbol data an output of the sawtooth-function output unit that is passed through a filter with a transmission function $N(D)F_2(D)-1$;
  an output of the sawtooth-function output unit is taken as an output symbol data of the precoder, wherein, in a base-point symbol timing that does not input the transmission symbol data, zero symbol data is output to the filter with the transmission function $N(D)F_2(D)-1$ and zero symbol data is taken as the output symbol data of the precoder,
  the correlator adds the output symbol data of the precoder and one obtained by passing the output symbol data though a filter with the transmission function $N(D)-1$ to take the addition result as an output symbol data of the correlator, thereby creating the transmission symbol waveform, the $N(D)$ is a transmission function of a notch filter for providing a notch characteristic to a spectrum energy of a transmission signal, and the transmission function $F_2(D)$ is set so that the fractionally-spaced equalizer serves as a phase equalizer.

7. A data transmitting apparatus used for a data transmitting method including the steps of:

inputting a transmission symbol data at a transmission symbol rate which is one-Nth (N is an integer of 2 or more) of a base-point symbol rate to create a transmission symbol waveform at the base-point symbol rate by a precoder and a correlator;

transmitting the transmission symbol waveform through a roll-off filter having a band corresponding to the base-point symbol rate;

inputting a reception signal to a fractionally-spaced equalizer that operates at the base-point symbol rate and is forcibly equalized at the transmission symbol rate by using a reference signal;

determining a level of a signal output from the fractionally-spaced equalizer at the transmission symbol rate; and obtaining a sawtooth function output of a level-determined symbol data, thereby outputting a reception symbol data, wherein the precoder has a sawtooth-function output unit;

wherein once in N times of a base-point symbol timing corresponding to the base-point symbol rate, another transmission symbol data is input to the sawtooth-function output unit, the another transmission symbol data is obtained by subtracting from the input transmission symbol data an output of the sawtooth-function output unit that is passed through a filter with a transmission function $N(D)F_1(D)F_2(D)-1$;

an output of the sawtooth-function output unit is taken as an output symbol data of the precoder, wherein, in a base-point symbol timing that does not input the transmission symbol data, zero symbol data is output to the filter with the transmission function $N(D)F_1(D)F_2(D)-1$ and zero symbol data is taken as the output symbol data of the precoder, the correlator adds the output symbol data of the precoder and one obtained by passing the output symbol data though a filter with the transmission function $N(D)F_1(D)-1$ to take the addition result as an output symbol data of the correlator, thereby creating the transmission symbol waveform, the $N(D)$ is a transmission function of a notch filter for providing a notch characteristic to a spectrum energy of a transmission signal, and an amplitude characteristic of the transmission function $F_1(D)$ is set to be close to a peak restriction characteristic of a power spectrum of the transmission signal, and the transmission function $F_2(D)$ is set so that the fractionally-spaced equalizer serves as a phase equalizer.

* * * * *